US011590886B1

(12) United States Patent
Frank et al.

(10) Patent No.: US 11,590,886 B1
(45) Date of Patent: Feb. 28, 2023

(54) METHOD AND SYSTEM FOR INSTALLING A VEHICLE AUXILIARY DEVICE CONTROLLER

(71) Applicant: Security Northwest, LLC, Eagle, ID (US)

(72) Inventors: Scott J. Frank, Meridian, ID (US); Lonnie R. Clarkson, Eagle, ID (US)

(73) Assignee: Security Northwest, LLC, Eagle, ID (US)

( * ) Notice: Subject to any disclaimer, the term of this patent is extended or adjusted under 35 U.S.C. 154(b) by 0 days.

(21) Appl. No.: 17/645,389

(22) Filed: Dec. 21, 2021

(51) Int. Cl.
| | |
|---|---|
| *B60Q 1/44* | (2006.01) |
| *B60Q 1/50* | (2006.01) |
| *B60Q 1/26* | (2006.01) |
| *B60R 11/02* | (2006.01) |
| *H04N 21/414* | (2011.01) |
| *H05B 45/00* | (2022.01) |

(52) U.S. Cl.
CPC ............ *B60Q 1/44* (2013.01); *B60Q 1/2603* (2013.01); *B60Q 1/50* (2013.01); *B60R 11/0235* (2013.01); *H04N 21/41422* (2013.01); *H05B 45/00* (2020.01)

(58) Field of Classification Search
CPC .......... H04N 21/41422; B60R 11/0235; B60Q 1/2603; B60Q 1/44; H05B 45/00; H04B 1/3822
See application file for complete search history.

(56) References Cited

U.S. PATENT DOCUMENTS

| | | | | |
|---|---|---|---|---|
| 2008/0077882 | A1* | 3/2008 | Kramer | G01C 21/3688 715/810 |
| 2009/0204310 | A1* | 8/2009 | Gittere | G07C 5/008 701/101 |

* cited by examiner

*Primary Examiner* — Anne M Hines
(74) *Attorney, Agent, or Firm* — Hawley Troxell Ennis & Hawley LLP; Philip McKay

(57) ABSTRACT

A control system for a vehicle display, such as a CHMSL, includes a control system module having an OEM connector first portion pre-attached to input wires and OEM connector second portion pre-attached to output wires. In another example, a control system for a vehicle display includes a control system module having a control system module input adaptor for removably connecting the control system module to an OEM first connector portion and a control system module output adaptor for removably connecting the control system module to an OEM second connector portion. Control systems for a vehicle display can be inserted between an input system and a vehicle display without having to identify specific wire harnesses or wires, and without cutting any wires. Different adaptors can be used to insert a single disclosed control system between an input system and a vehicle display in multiple types and makes of vehicles.

20 Claims, 20 Drawing Sheets

METHOD AND SYSTEM FOR INSTALLING A VEHICLE AUXILIARY DEVICE CONTROLLER

BACKGROUND

Numerous electronic warning and alert devices have become part of our everyday lives and are largely taken for granted. In many cases, what were once new and novel warning and alert systems are now essential for the safety of the public. This is largely due to the fact that the public has come to expect these systems to be present and operating correctly. However, in a world of seemingly endless distractions, many well proven warning and alert systems can become ineffective and the warning provided can be lost in a virtual sea of visual and auditory distractions.

For instance, numerous types of vehicle displays and systems that employ relatively new technology have become standard features that are relied upon by not only vehicle owners and operators, but also by other vehicle operators and pedestrians for safety and situational awareness. For instance, Center High Mount Stop Lamps (CHMSLs), back-up cameras, message systems/displays, status systems/displays, and various forms of custom, safety, and special purpose lighting and displays have become well known and have been widely adopted, and even mandated by law in some cases. Consequently, some of these devices and systems are now simply expected, or mandated, to be present and are assumed/relied upon to be operating correctly by both vehicle owners/operators and others sharing the road. However as noted, some of these now well proven warning and alert systems have become ineffective and no longer provide sufficient warning.

As a specific example, at one time, traditional tail light-based brake lights were largely sufficient to attract the attention of drivers behind a vehicle and warn them that the vehicle ahead was applying the brakes; thereby providing the driver behind the vehicle an opportunity to apply their own brakes to avoid a rear-end collision. However, as traffic became less manageable, and more distractions were introduced on the average street or highway, these traditional tail light-based brake light systems were no longer considered capable of sufficiently catching other drivers' attention and providing adequate warning. As a result, in 1986, third brake lights, called Center High Mount Stop Lamps (CHMSLs) were mandated in the United States by the Federal Government. CHMSLs, as the name implies, are typically mounted in a rear window, or other rear facing location, of a vehicle and are designed to be at approximately the average eye level of a driver behind the vehicle. The concept behind CHMSLs is that a brake light at eye level is more likely to be seen/noticed than the lower mounted traditional tail light-based brake lights.

FIG. 1A shows a typical CHMSL 100. As seen in FIG. 1A, CHMSL 100 includes a front, or rear facing side 101 including a red lamp cover/lens 102 and a back side 103 including an OEM connector portion 122.

FIG. 1B shows a typical CHMSL, such as CHMSL 100 of FIG. 1A, mounted in a vehicle 107.

In operation a CHMSL 100, like the lower mounted traditional tail light-based brake lights, are electrically connected by wires and electronic sensors to the brake pedal of the parent vehicle.

FIG. 1C shows a simplified block diagram of the electrical connections and systems for a CHMSL system 110 including CHMSL 100. As seen in FIG. 1C, the brake pedal 111 of the parent vehicle is typically connected to some form of a brake pedal motion monitor 113 that detects motion 112 of the brake pedal 111. Consequently, in typical operation, when the brake pedal 111 is depressed by the driver, the motion 112 of the brake pedal 111 is detected by brake pedal motion monitor 113. This, in turn, causes switch 114 to apply CHMSL lamp supply power 115 to lamps (not shown) in CHMSL 100 by one or more power wires 116.

In this way, when brake pedal 111 is depressed, sufficient voltage and current from CHMSL lamp supply power 115 to power one or more CHMSL light bulbs is provided along one or more power wires 116 connecting the CHMSL lamp supply power 115 to the CHMSL 100 back side 103 at OEM connector portion 122. This then causes one or more light bulbs (not shown) in the CHMSL 100 to light up and/or illuminate at a higher intensity. In this way, when the brake pedal 111 is depressed by the driver, the CHMSL 100 comes on in a steady state, i.e., one or more lamps light red lamp cover/lens 102 for as long as the brake pedal 111 remains depressed. This serves to warn the drivers behind the parent vehicle that the brakes of the parent vehicle have been applied and the vehicle is slowing down. Consequently, the drivers behind the parent vehicle are alerted to apply their own brakes.

In this particular example, the one or more power wires 116 would run from the vehicles power supply, i.e., a battery, alternator, voltage regulator, etc. (often in the front of the vehicle) to the CHMSL 100 mounted at the very back of the vehicle. Consequently, the one or more power wires 116 often run close to the full length of the vehicle. Typically, the one or more power wires 116 connecting the brake pedal 111 to the CHMSL 100 are bundled with numerous other wires connecting various other vehicle systems in one or more "wire harnesses" running throughout the vehicle. These wires harness can include numerous wires connecting numerous vehicle sub-systems and components. In this particular example, the wire harness including one or more power wires 116 could run close to the full length of the vehicle. Consequently, wire harnesses can be quite complicated and difficult to work on.

FIG. 1D shows a typical wire harness 140.

Returning to FIG. 1C, typically, at either end of the one or more power wires 116 connecting the CHMSL 100 and the brake pedal 111 there are factory supplied, i.e., Original Equipment Manufacturer (OEM) connectors. These OEM connectors typically include two connector portions/parts, often called female and male connector portions/pairs, and are often proprietary to the OEM. One example of an OEM connector is any of the connectors produced by Tyco and/or similar connector manufacturers.

FIG. 1E shows two illustrative examples of OEM connector portion pair 121 and 122, forming OEM connector 120, and OEM connector pair 131 and 132, forming OEM connector 130.

As seen in FIG. 1E, OEM connector 120 includes OEM connector portion 121 which, in this specific illustrative example would be a "female" OEM connector portion and OEM connector portion 122 which, in this specific illustrative example would be a "male" OEM connector portion. OEM connector 120 is formed by inserting OEM connector portion 121 into OEM connector portion 122 thereby making an electrical connection between the wires connected to OEM connector portion 121 and the wires connected to OEM connector portion 122.

Similarly, as seen in FIG. 1E, OEM connector 130 includes OEM connector portion 131 which, in this specific illustrative example, would be a "female" OEM connector portion and OEM connector portion 132 which, in this specific illustrative example would be a "male" OEM connector portion. OEM connector 130 is formed by inserting OEM connector portion 131 into OEM connector portion 132; thereby making an electrical connection between the wires connected to OEM connector portion 131 and the wires connected to OEM connector portion 132.

FIG. 1F shows a simplified diagram of the use of OEM connectors to connect an input system, e.g., brake pedal motion monitor 113, to a vehicle display, e.g., CHMSL 100.

Referring to FIGS. 1C, 1E, and 1F, as seen in FIG. 1F, typically the input system, in this example brake pedal motion monitor 113 or switch 114, includes an OEM connector first portion, in this example OEM connector portion 121 that is a female OEM connector portion. In addition, at end 191, power wires 116 include an OEM connector second portion, in this example OEM connector portion 122 that is a male OEM connector portion. Consequently, OEM connector portion 121 and OEM connector portion 122, when connected, form an OEM connector 120 that electrically couples the input system, in this example brake pedal motion monitor 113 or switch 114, to power wires 116.

Likewise, at end 193 power wires 116 include an OEM connector first portion, in this example OEM connector portion 121 that is a female OEM connector portion. In addition, the vehicle display, in this example CHMSL 100, includes an OEM connector second portion, in this example OEM connector portion 122 that is a male OEM connector portion. Consequently, OEM connector portion 121 and OEM connector portion 122, when connected, form an OEM connector 120 that electrically couples power wires 116 to CHMSL 100.

As noted, there are numerous different types of OEM connectors, each requiring the use of compatible pairs of OEM connector portions. Which of the numerous types or OEM connectors is used with any given CHMSL system varies from vehicle type to vehicle type, vehicle make to vehicle make, and from vehicle model to vehicle model. In addition, as noted, many OEM connectors are proprietary to the vehicle manufacturer. Consequently, there is no one "universal" OEM connector.

Of note is the fact that any modification and/or repair of prior art CHMSL systems can be extremely difficult. This true for several reasons. First, accessing and/or removing the CHMSL housing and/or light is often difficult and complicated with significant space restrictions and often requires specialized tools and/or the removal of parts/systems around the CHMSL. In addition, even once the correct wire harness is accessed, identifying and accessing any individual wire in the wire harness can also be a challenge. This operation is also often complicated with significant space restrictions and therefore also often requires specialized tools and/or the removal of parts/systems.

In addition, the use of OEM connectors can also provide challenges in terms of parts/inventory maintenance, space restrictions, and the need for specialized tools.

FIG. 1G shows one example of the significant space restrictions that are typically encountered when trying to access a CHMSL system. Shown in FIG. 1G is an OEM connector portion 121 that is only accessible via hole 170. As seen in FIG. 1G, hole 170 measures a mere eighteen millimeters by fifteen millimeters. In addition, power wires 116 allow OEM connector portion 121 to extend outside hole 170 by only about an inch. Clearly this does not provide much access and working space and is a significant opportunity for human error. As a specific example, if OEM connector portion 121 and/or power wires 116 drop into hole 170, significant labor would be expended to retrieve OEM connector portion 121 and/or power wires 116, either by using special tools or by taking apart panels and other systems to access the lost OEM connector portion 121 and/or power wires 116.

In addition, identifying and accessing the correct wire harnesses, such as wire harnesses 140 is often also difficult. This operation is also often complicated with significant space restrictions and therefore also often requires specialized tools and/or the removal of parts/systems. In addition, even once the correct wire harness is accessed, identifying and accessing any individual wire in the wire harness can also be a challenge as can be readily seen in FIG. 1D.

Returning to FIGS. 1A, 1B, and 1C, for several decades, the addition of the CHMSLs to the lower mounted traditional tail light-based brake lights was considered an adequate solution for providing a stronger and more noticeable warning that a driver of the vehicle had applied their brakes. However, as even more traffic, and more distractions, such as cellular phones, more complicated dash board displays, and more electronic devices and features for a driver to interact with have emerged, even the addition of CHMSLs to the lower mounted traditional tail light-based brake lights now often fails to provide sufficient attention getting power, and therefore fails to provide the level of alert/warning needed on modern roads and highways.

To address these new conditions, methods and systems for providing more attention getting CHMSLs, and other warning systems and visual devices, have been sought. One potential improvement involves making existing CHMSLs more dynamic and noticeable to the human eye. For instance, a blinking or pulsing CHMSL has been found to be more effective at getting a person's attention than a more static, i.e., solid-on display CHMSL, such as traditional CHMSLs. These dynamic display CHMSLs have been found effective and can include other forms of dynamic displays such as, but not limited to, various changing patterns, incremental/bar-like displays, flashing displays, rolling displays, and even message/text-based displays. This is because the human vision system is optimized to detect motion/change, or perceived motion/change, in the surrounding environment far more readily than a static or stable feature. In short, a dynamically changing feature/alert catches human attention far more effectively than a static, or steady on, feature/alert. Consequently, it has been found that drivers and pedestrians, i.e., humans, are far more likely to notice, and to react to, perceived movement/change, such as pulsing displays, blinking displays, flashing displays, changing pattern displays, incremental/bar-like displays, rolling displays, or message/text-based displays, much better than they do to a steady state, such as a steady on red light.

Consequently, there is little doubt that a pulsing, blinking, flashing, changing pattern, incremental/bar-like, rolling, message/text-based or otherwise dynamic display CHMSL is far more effective at catching driver's attention than the currently used steady red on CHMSLs. It follows that a pulsing, blinking, flashing, changing pattern, incremental/bar-like, rolling, message/text-based or otherwise dynamic display CHMSL provides a better warning system and therefore safer driving conditions. As a result, it is arguable that virtually every person who drives a vehicle, and/or is otherwise on the road, would be safer in a world of pulsing, blinking, flashing, changing pattern, incremental/bar-like, rolling, message/text-based or otherwise dynamic display CHMSLs.

However, in order to provide a dynamic display CHMSL, dynamic display CHMSL control systems must be employed to cause the CHMSLs to dynamically change their displays.

In short, a dynamic display CHMSL control system must be present between the brake pedal of the parent vehicle the CHMSL.

FIG. 2A is a simplified block diagram of some of the major components of a potential dynamic display CHMSL system 200, including a dynamic display CHMSL control system 210. As seen in FIG. 2A, like prior art system 100 of FIG. 1C, using system 200, the brake pedal 111 of the parent vehicle is typically connected to some form of a brake pedal motion monitor 113 that detects motion 112 of the brake pedal 111. Consequently, in typical operation, when the brake pedal 111 is depressed by the driver, the motion 112 of the brake pedal 111 is detected by brake pedal motion monitor 113. This, in turn, causes CHMSL lamp supply power 115 to be electrically coupled to one or more power wires 116 by switch 114.

However, in contrast to prior art system 100 of FIG. 1C, in order to provide a dynamic display CHMSL feature, when the brake pedal 111 is depressed by the driver and the motion 112 of the brake pedal 111 is detected, CHMSL lamp supply power 115 must be electrically coupled to dynamic display CHMSL control system 210 by switch 114 and one or more power wires 116. The dynamic display CHMSL control system 210 then regulates, or controls, the application of CHMSL lamp supply power 115 selectively and dynamically to provide power to the CHMSL 100. These modified power signals, e.g., the regulated and controlled CHMSL lamp supply power 115 application, are then provided to CHMSL 100 back side 103 at OEM connector portion 122 and cause one or more light bulbs in the CHMSL 100 to dynamically light up and/or illuminate at a higher intensity. In this way, when the brake pedal 111 is depressed by the driver, the CHMSL warning lights can be made to create a pulsing, blinking, flashing, changing pattern, incremental/bar-like, rolling, message/text-based or otherwise dynamically changing CHMSL display. By this process CHMSL 100 is transformed into a dynamic display CHMSL.

This can be a very effective attention getting/alert system. However, as seen above, the splicing in, i.e., insertion of the dynamic display CHMSL control system 210 is required in order to translate the static signal from the brake pedal 111 to a dynamic pulsing, blinking, flashing, changing pattern, incremental/bar-like, rolling, message/text-based or otherwise dynamically changing CHMSL display signal.

Currently, there is no Federal mandate for dynamic display CHMSLs. Consequently, dynamic display CHMSLs are not currently standard equipment on new cars. As a result, dynamic display CHMSLs would typically be available, if at all, only as an aftermarket added feature. This means the installation of a dynamic display CHMSL control system would be performed after the OEM CHMSL system, such as system 110 of FIG. 1C, is installed.

As noted above, any modification to an OEM CHMSL system, such as system 110 of FIG. 1C, is difficult at best due to the complications discussed above regrading accessing and/or removing the CHMSL housing and/or light, the often significant space restrictions, the need for specialized tools and/or the removal of parts/systems around the CHMSL, the difficulty identifying and accessing the correct wire harnesses and identifying and accessing the correct individual wire in the wire harness, and the need for numerous variants of often proprietary OEM connectors for the numerous types, brands, and models of vehicles and CHMSL units. For a more detailed discussion of these issues see the discussion above with respect to FIGS. 1C, 1D, 1E, 1F, and 1G.

These factors represent significant issues when it comes to the installation of a dynamic display CHMSL control system, such as CHMSL display control system 210 in FIG. 2A. In essence, each potential installation of a dynamic display CHMSL control system 210, if at all possible, would be a labor-intensive job customized to each vehicle. Not only would this result in significant cost to install a dynamic display CHMSL control system, such as CHMSL display control system 210, but it would also result in a significant risk of human error and system damage.

As one illustrative example, like the example of FIG. 1C, the one or more power wires 116 would run from the vehicles power supply, i.e., a battery, alternator, voltage regulator, etc. (often in the front of the vehicle) to the CHMSL 100 mounted at the very back of the vehicle. Consequently, the one or more power wires 116 often run close to the full length of the vehicle. Typically, the one or more power wires 116 connecting the brake pedal 111 to the CHMSL 100 are bundled with numerous other wires connecting various other vehicle systems in one or more wire harnesses running throughout the vehicle. These wires harnesses can include numerous wires connecting numerous vehicle sub-systems and components. In this particular example, the wire harness including one or more power wires 116 could run close to the full length of the vehicle. Consequently, wire harnesses can be quite complicated and difficult to work on and the identification of the correct wires within a wire harness can be quite challenging. As an illustrative example, see FIG. 1D and the discussion above.

The installation of a dynamic display CHMSL control system 210 typically would involve identifying and accessing the correct the CHMSL wire harness, and also identifying and accessing the correct power wires 116. This, in and of itself, would represent quite an ordeal given the issues discussed above with respect to 1C, 1D, 1E, 1F, and 1G and represent a significant opportunity for the introduction of human error.

However, even more problematic, once the hopefully correct power wires 116 had been accessed and identified, if they could be, these wires must be cut in order to insert, i.e., splice in, dynamic display CHMSL control system 210. This cutting would not only clearly represent an opportunity for the introduction of human error, but it also could void the manufacturer's vehicle warranty leaving the owner uncovered.

Further, once the hopefully correct wires had been cut, the dynamic display CHMSL control system 210 must then be hand "spliced" between the ends of the newly cut power wires 116. This would typically be done by direct soldering or using any one of the many known crimping and/or universal connection-based systems. Unfortunately, these prior art splicing methods would often result in less-than-ideal connections that could often be electrically unsound and/or not weather and operational "wear and tear" proof over the long term.

FIG. 2B shows two examples of prior art crimping and/or universal connection-based systems 211A and 21B that could be used to splice in dynamic display CHMSL control system 210. However, as noted, prior art crimping and/or universal connection-based systems 211A or 211B all too often fails to provide a strong and dependable electrical connection that is weather and wear and tear proof over the long term. In addition, even using prior art crimping and/or universal connection-based systems 211A or 211B, there is still the need to cut power wires 116 and therefore significant opportunity for the introduction of human error and voiding of vehicles warranties.

For these and many other reasons, the potential methods and systems for installing a dynamic display CHMSL control system 210 discussed above are far from ideal. This is extremely problematic for several reasons. First, because of the error prone nature of these methods and systems for installing a dynamic display CHMSL control system 210, many vendors, including car sales companies, aftermarket vehicle shops, and private owners would refuse to attempt the installation of dynamic display CHMSL control systems 210. This, of course, means that the vehicle owners, and other drivers/people on the road, would be denied the safety of these highly effective systems.

Second, because of the potential large cost involved with these methods and systems for installing a dynamic display CHMSL control system 210, many vehicle owners could not afford the installation of dynamic display CHMSL control systems 210, even if the service were offered. This also means that many vehicle owners, and other drivers/people on the road, would again be denied the safety of these highly effective systems.

In addition, because of the error prone nature of these methods and systems for installing a dynamic display CHMSL control system 210, and the possibility of the resulting modified CHMSL systems 200 failing during normal operational weather and wear and tear due to the spicing issues discussed above, there would be a significantly increased risk that the CHMSL 100 would fail completely, i.e., fail to light at all. This situation is arguably the worst of possibilities since a driver behind such a vehicle will assume that the CHMSL 100 will at least statically come on when the driver hits the brakes. Consequently, the driver behind the vehicle will assume no CHMSL 100 light means no brakes applied. However, given the failed CHMSL 100 of this scenario, this assumption could be incorrect and brakes may well be applied. The result is a situation where it would be safer to have no CHMSL 100 at all so that there is no assumption made by other drivers.

The result of the current situation discussed above is that the highly effective dynamic display CHMSL technology has not been widely adopted or employed. Consequently, the potential safety advantages of the wide-spread adoption of dynamic display CHMSLs have not been realized and untold numbers of preventable accidents have occurred, and will continue to occur, until a technical solution to the problems discussed above is provided.

While in the discussion above dynamic display CHMSLs, and dynamic display CHMSL control systems, were discussed as particular illustrative examples of vehicle displays and systems, those of skill in the art will readily recognize that other types of vehicle displays and systems suffer from the same or similar issues. For instance, control and/or power systems for back-up cameras, message system/displays, and various forms of custom, safety, and specialized lighting and displays face many of the same issues discussed above, i.e., the need for the installation of aftermarket dynamic display control systems.

What is needed is a technical solution to the long-standing technical problem of providing for the efficient, effective, and reliable way to install control systems for vehicle displays, such as dynamic display CHMSL control systems for dynamic display CHMSLs.

SUMMARY

Disclosed here are methods and systems that provide for the efficient, effective, and reliable installation of control systems for vehicle displays. Consequently, the disclosed methods and systems provide for the incorporation and wide-spread adoption of these new technologies. As one illustrative example, the disclosed methods and systems provide for the efficient, effective, and reliable installation of dynamic display CHMSL control systems for dynamic display CHMSLs. Consequently, the disclosed methods and systems allow for the wide-spread adoption of dynamic display CHMSLs; thereby providing for safer roads and a potentially significant reduction in accidents and injury.

To this end, in one embodiment, a display control system for a vehicle display includes a display control system module. In one embodiment, an OEM connector second portion, e.g., a female or male OEM connector portion, is pre-attached/hardwired to one or more input wires of the display control system module and an OEM connector second portion e.g., a male or female OEM connector portion that is complimentary to the OEM connector first portion, is pre-attached/hardwired to one or more output wires of the display control system module.

Consequently, the disclosed display control system for a vehicle display can be inserted between an input system and a vehicle display by simply disconnecting the existing OEM connector first and second portions connecting the input system and the vehicle display, e.g., disconnecting the existing female and male OEM connection portions, and then attaching the pre-attached/hardwired OEM connector second portion of the display control system module to the complimentary existing OEM connector first portion attached to the input system and attaching the pre-attached/hardwired OEM connector first portion of the display control system module to the existing complimentary OEM connector second portion attached to the vehicle display.

In this way the disclosed display control system for a vehicle display can be inserted between an input system, such as a brake pedal motion monitor, and a vehicle display, such as a CHMSL, without having to identify specific wire harnesses or wires and without having to cut any wires or perform any aftermarket splicing in of the display control system.

In one embodiment, a dynamic display CHMSL control system for a dynamic display CHMSL includes a dynamic display CHMSL control system module. In one embodiment, the CHMSL control system module includes an OEM connector second portion, e.g., a female or male OEM connector portion, pre-attached/hardwired to one or more input wires of the dynamic display CHMSL control system module and an OEM connector first portion e.g., a male or female OEM connector portion that is complimentary to the OEM connector second portion, pre-attached/hardwired to one or more output wires of the dynamic display CHMSL control system module.

Consequently, the disclosed dynamic display CHMSL control system for a dynamic display CHMSL can be inserted between a brake pedal/brake pedal motion monitoring system, i.e., an input system, and a CHMSL, i.e., a vehicle display, by simply disconnecting the existing OEM connector first and second portions connecting the brake pedal/brake pedal motion monitoring system and the CHMSL, e.g., disconnecting the existing female and male OEM connection portions, and then attaching the pre-attached/hardwired OEM connector second portion of the dynamic display CHMSL control system module to the complimentary existing OEM connector first portion attached to the brake pedal/brake pedal motion monitoring system and attaching the pre-attached/hardwired second OEM connector first portion of the dynamic display CHMSL control system module to the existing complementary OEM connector second portion attached to the CHMSL.

In this way, the disclosed dynamic display CHMSL control system for a dynamic display CHMSL can be inserted between the brake pedal/brake pedal motion monitoring system and the CHMSL without having to identify specific wire harnesses or wires and without having to cut any wires or perform any aftermarket splicing in of the dynamic display CHMSL control system.

In one embodiment, a control system for a vehicle display includes a control system module with control system for a vehicle display circuitry and components being enclosed in the control system module. In one embodiment, the control system module includes one or more control system module input wires connected to electrical connections within the control system module at one end and a generic adaptor connector second portion at the other end. In one embodiment, the control system module includes one or more control system module output wires connected to electrical connections within the control system module at one end and a generic adaptor connector first portion at the other end.

In one embodiment, the control system for a vehicle display includes a control system module input adaptor for removably connecting the one or more control system module input wires to an existing OEM connector second portion. In one embodiment, the control system module input adaptor includes one or more input adaptor wires connected to a generic adaptor connector first portion, which is complementary to the generic adaptor connector second portion of the control system module input wires, at one end and an OEM connector second portion at the other end.

In one embodiment, the control system for a vehicle display includes a control system module output adaptor for removably connecting the one or more output wires of the control system module to an existing OEM connector second portion. In one embodiment, the control system module output adaptor includes one or more output adaptor wires connected to a generic output adaptor connector second portion, which is complementary to the generic adaptor connector first portion of the control system module output wires, at one end and an OEM connector first portion at the other end.

In one embodiment, the generic input and output adaptor connector first portions can be connected to the complimentary generic output and input adaptor connector second portions.

In one embodiment the OEM connector second portion of the control system module input adaptor can be connected to a complimentary existing OEM connector first portion of power lines and/or an input system, such as a brake pedal motion monitor. In one embodiment the OEM connector first portion of the control system module output adaptor can be connected to a complimentary existing OEM connector second portion of power wires and/or a vehicle display system, such as a CHMSL.

Consequently, the disclosed display control system for a vehicle display can be inserted between an input system and a vehicle display by simply disconnecting the existing OEM connector first and second portions connecting the input system and the vehicle display, e.g., the existing female and male OEM connection portions, and then attaching the OEM connector second portion of the control system module input adaptor to the existing OEM connector first portion coupled to the input system and attaching the OEM connector first portion of the control system module output adaptor to the existing OEM connector second portion coupled to the vehicle display.

In this way the disclosed display control system for a vehicle display can be inserted between the input system and the vehicle display without having to identify specific wire harnesses or wires and without having to cut any wires or perform any aftermarket splicing in of the display control system.

In addition, the use of removable control system module input and output adaptors allows for the use of a single display control system module with numerous types of vehicles, vehicle models, and vehicle displays by simply using different removable display control system module input and output adaptors having different OEM input and output connector portions.

In one embodiment, a dynamic display CHMSL control system for a CHMSL includes a dynamic display CHMSL control system module with circuitry and components for a dynamic display CHMSL control system for a CHMSL display being enclosed in the dynamic display CHMSL control system module. In one embodiment, the dynamic display CHMSL control system module includes one or more dynamic display CHMSL control system module input wires connected to electrical connections within the dynamic display CHMSL control system module at one end and a generic adaptor connector second portion at the other end. In one embodiment, the dynamic display CHMSL control system module includes one or more dynamic display CHMSL control system module output wires connected to electrical connections within the dynamic display CHMSL control system module at one end and a generic adaptor connector first portion at the other end.

In one embodiment, the dynamic display CHMSL control system for a vehicle display includes a dynamic display CHMSL control system module input adaptor for removably connecting the one or more input wires of the dynamic display CHMSL control system module to an existing OEM connector first portion. In one embodiment, the dynamic display CHMSL control system module input adaptor includes one or more input adaptor wires connected to a generic adaptor connector first portion at one end and an OEM connector second portion at the other end.

In one embodiment, the dynamic display CHMSL control system for a CHMSL display includes a dynamic display CHMSL control system module output adaptor for removably connecting the one or more output wires of the dynamic display CHMSL control system module to an existing OEM connector second portion. In one embodiment, the dynamic display CHMSL control system module output adaptor includes one or more output adaptor wires connected to a generic output adaptor connector second portion at one end and an OEM connector first portion at the other end.

In one embodiment, the generic input and output adaptor connector first portions can be connected to the complimentary generic output and input adaptor connector second portions.

In one embodiment, the OEM connector second portion of the dynamic display CHMSL control system module input adaptor can be connected to a complimentary existing OEM connector first portion of power lines and/or a brake pedal motion monitor. In one embodiment, the OEM connector first portion of the dynamic display CHMSL control system module output adaptor can be connected to a complimentary OEM connector second portion of power lines and/or a CHMSL.

Consequently, the disclosed dynamic display CHMSL control system for a vehicle display can be inserted between a brake pedal motion monitor and a CHMSL by simply disconnecting the existing OEM connector first and second portions connecting the input system and the CHMSL, e.g., disconnecting the existing female and male OEM connection portions, and then attaching the OEM connector second portion of the dynamic display CHMSL control system module input adaptor to the existing OEM connector first portion coupled to the brake pedal motion monitor and attaching the OEM connector first portion of dynamic display CHMSL control system control system module output adaptor to the existing OEM connector second portion coupled to the CHMSL.

In this way the disclosed dynamic display CHMSL control system for a vehicle display can be inserted between the brake pedal motion monitor and the CHMSL without having to identify specific wire harnesses or wires and without having to cut any wires or perform any aftermarket splicing in of the dynamic display CHMSL control system.

In addition, the use of removable dynamic display CHMSL control system module input and output adaptors with generic connector portions allows for the use of a dynamic display CHMSL control system module with numerous types of vehicles, vehicle models, and vehicle displays by simply using different removable dynamic display CHMSL control system module input and output adaptors having different OEM input and output connector portions.

Consequently, the disclosed methods and systems provide for the efficient, effective, and reliable installation of control systems for dynamically controlled vehicle displays, such as dynamic display CHMSL control systems for dynamic display CHMSLs. As a result, the disclosed methods and systems provide for the incorporation and wide-spread adoption of these new technologies.

As one illustrative example, the disclosed methods and systems provide for the efficient, effective, and reliable installation dynamic display CHMSL control systems for dynamic display CHMSLs. Consequently, the disclosed methods and systems allow for the wide-spread adoption of dynamic display CHMSLs; thereby providing for safer roads and a potentially significant reduction in accidents.

BRIEF DESCRIPTION OF THE DRAWINGS

Reference will now be made in detail to the exemplary aspects of the present invention that are illustrated in the accompanying drawings. Wherever possible, the same reference numbers will be used throughout the drawings to refer to the same or similar structure.

One skilled in the art will readily recognize that the above figures are merely illustrative examples, and that other elements, functions, and features can be provided and implemented without departing from the characteristics and features of the invention.

DETAILED DESCRIPTION

The disclosed methods and systems provide for the efficient, effective, and reliable installation of dynamic display control systems for dynamically controlled vehicle displays such as dynamic display CHMSL control systems for dynamic display CHMSLs. As a result, the disclosed methods and systems provide for the incorporation and widespread adoption of these new, and potentially lifesaving, technologies; thereby providing for safer roads and a potentially significant reduction in accidents and injuries.

Figure 1A:
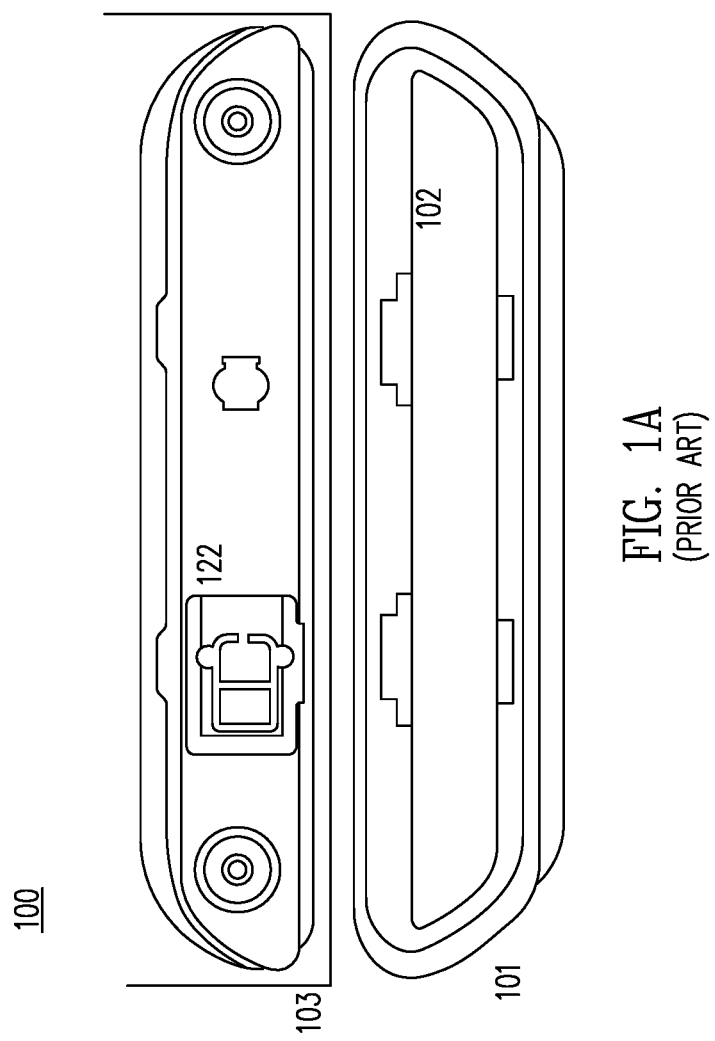
FIG. 1A shows one illustrative example of a typical CHMSL.
Figure 1B:
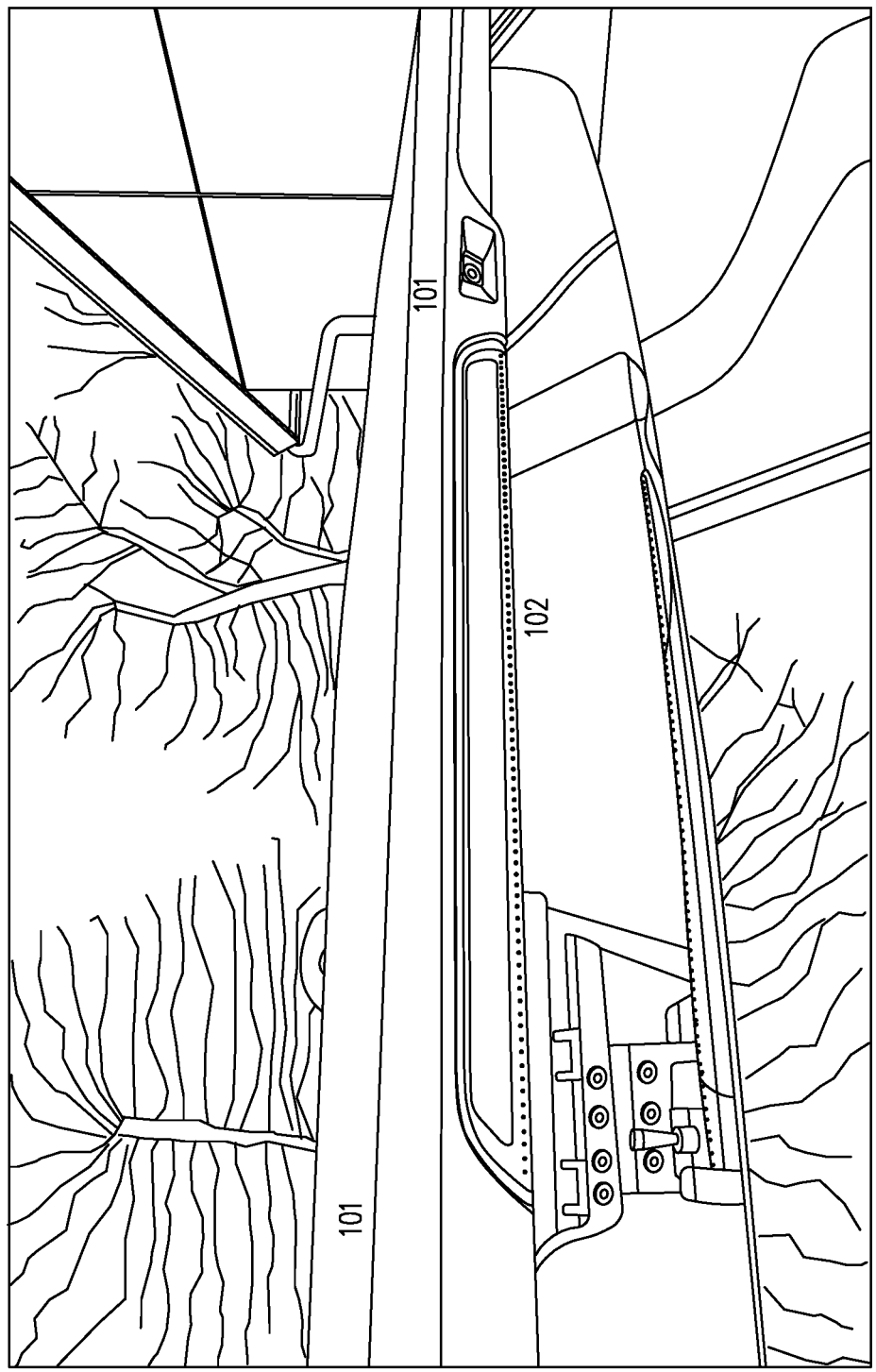
FIG. 1B shows a typical CHMSL, such as the CHMSL of FIG. 1A, mounted in a vehicle.
Figure 1C:
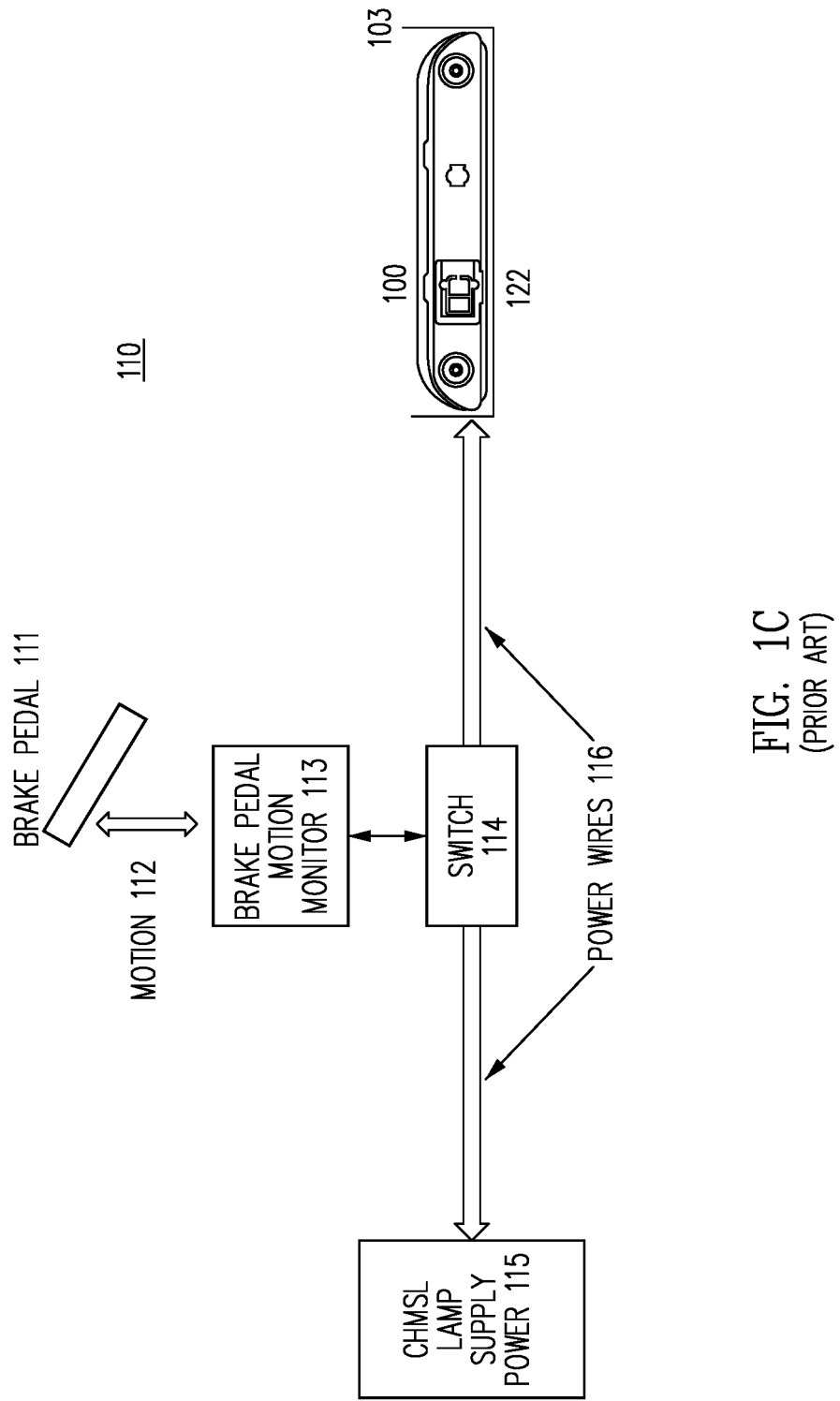
FIG. 1C shows a simplified block diagram of the electrical connections and systems for a CHMSL, such as the CHMSL of FIG. 1A.
Figure 1D:
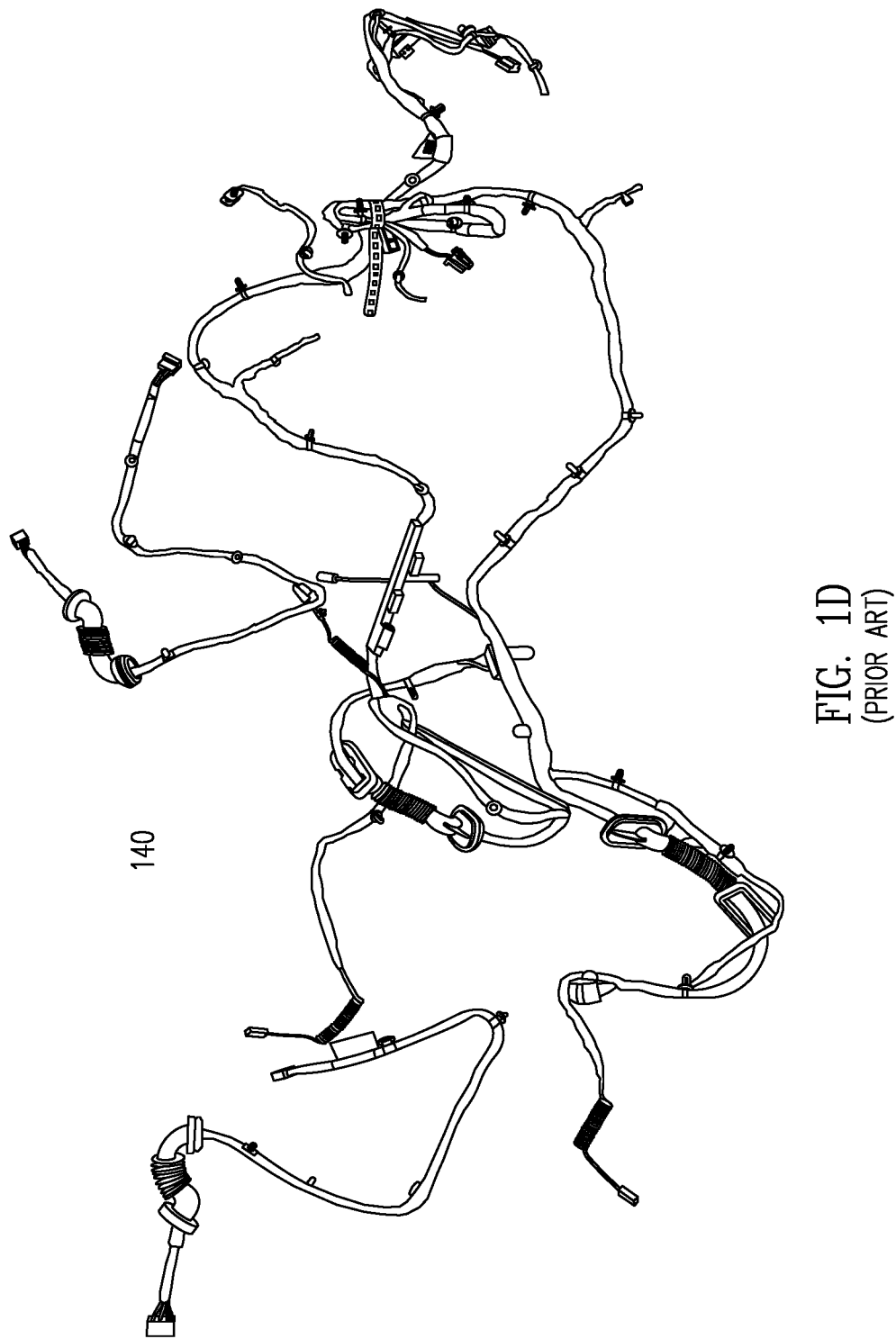
FIG. 1D shows a typical wire harness.
Figure 1E:
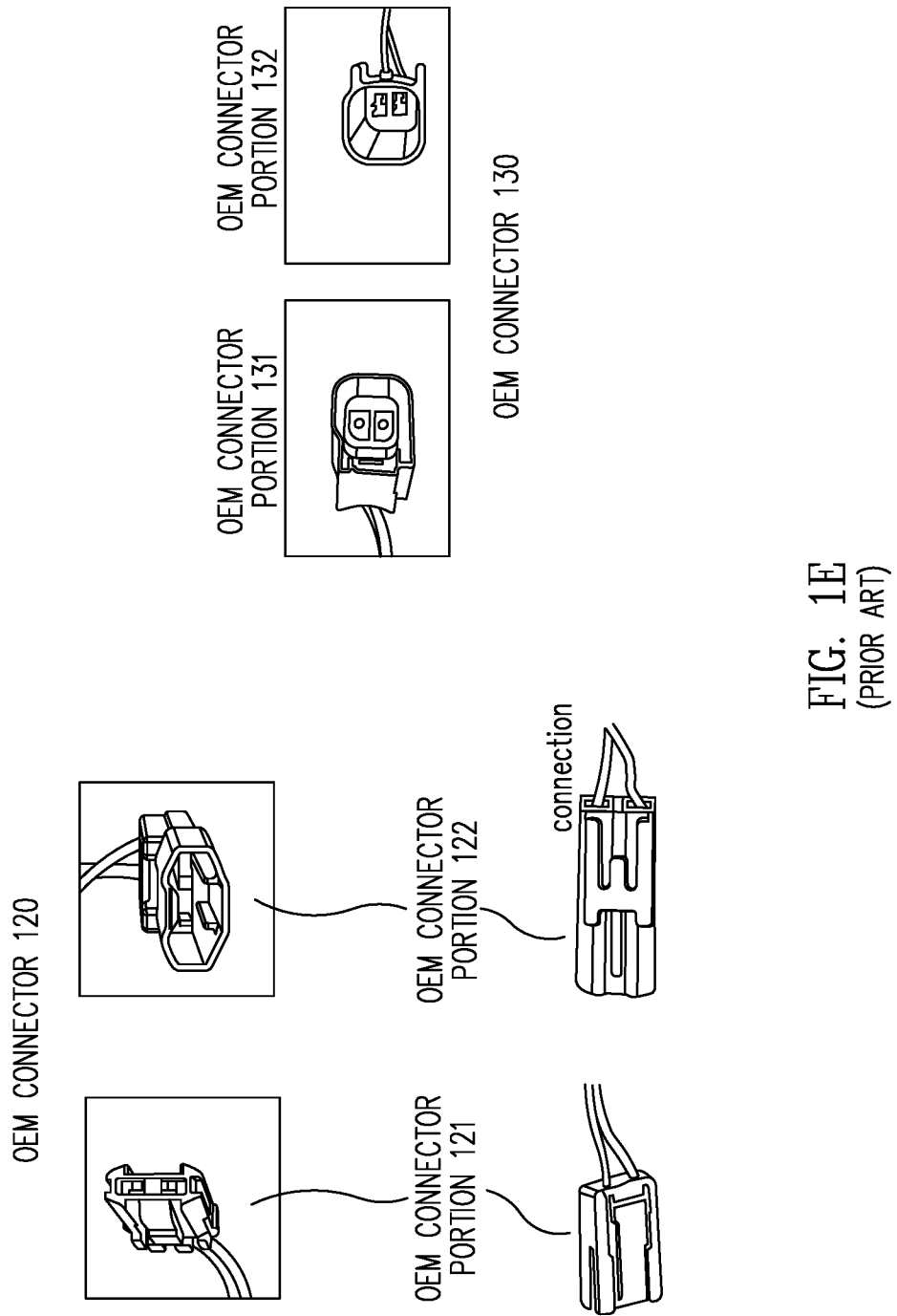
FIG. 1E shows two illustrative examples of OEM connectors.
Figure 1F:
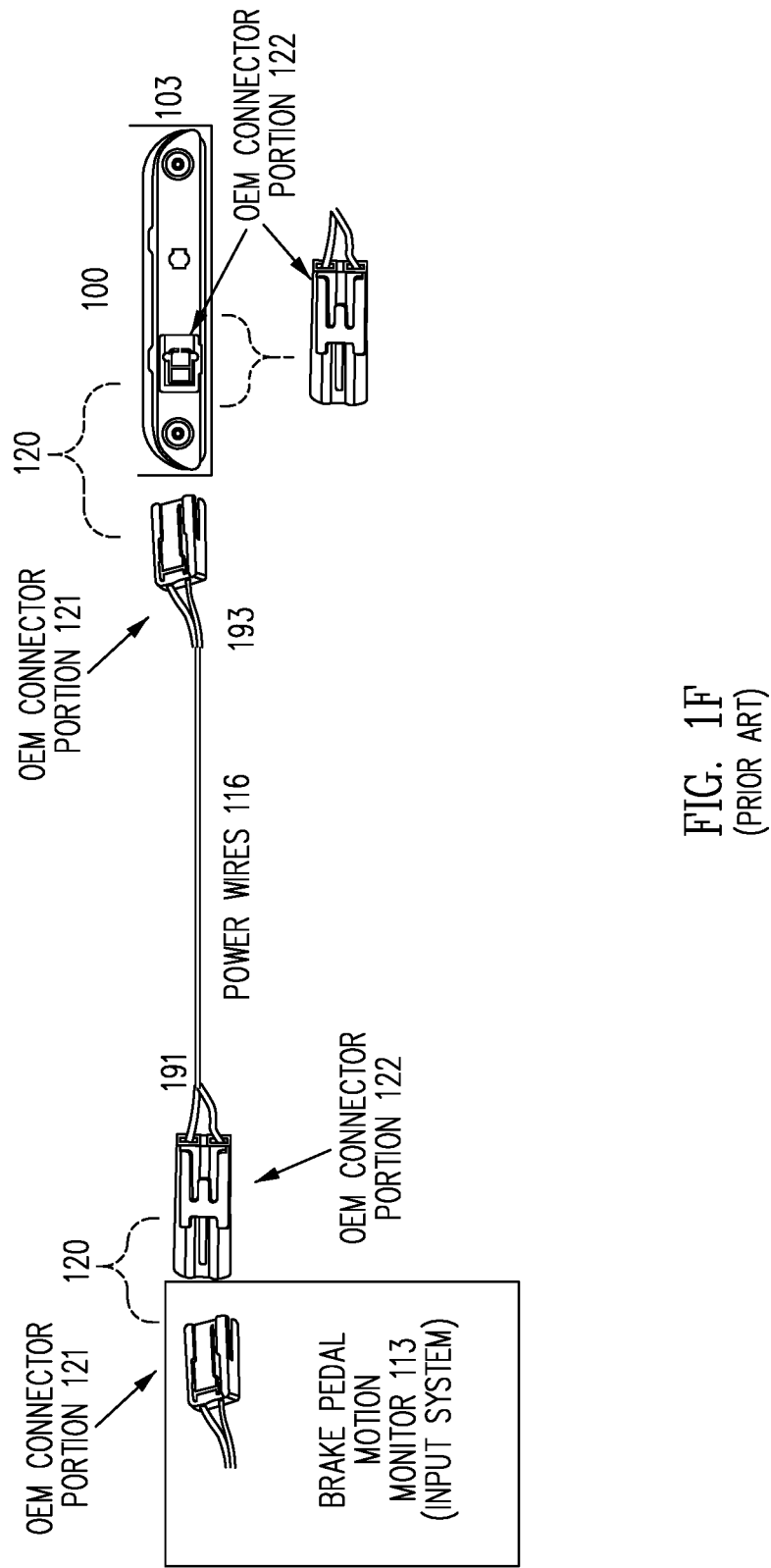
FIG. 1F shows a simplified diagram of the use of OEM connectors to connect an input system, e.g., brake pedal motion monitor, to a vehicle display, e.g., a CHMSL.
Figure 1G:
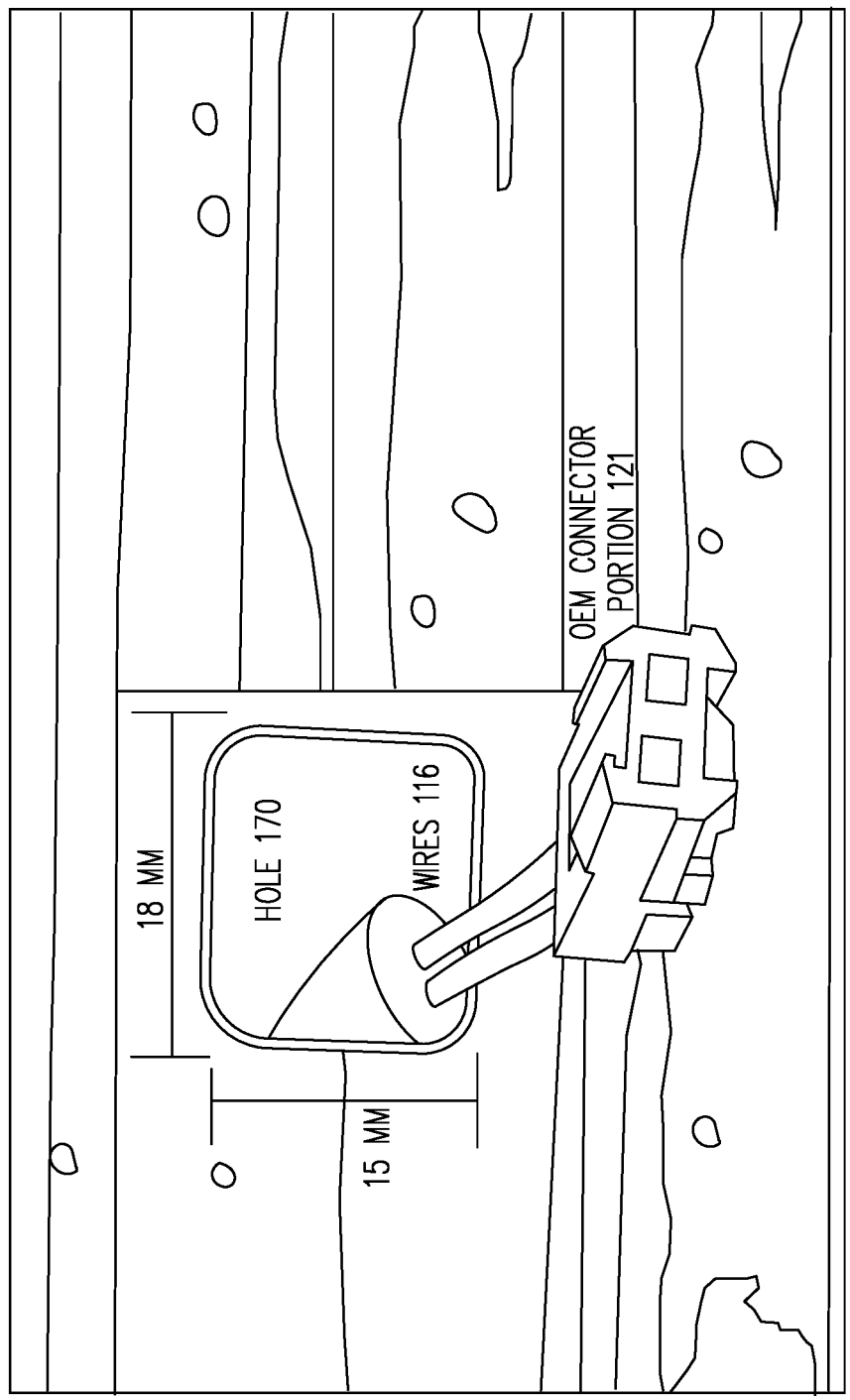
FIG. 1G shows one example of the significant space restrictions that are typically encountered when trying to access a CHMSL system.
Figure 2A:
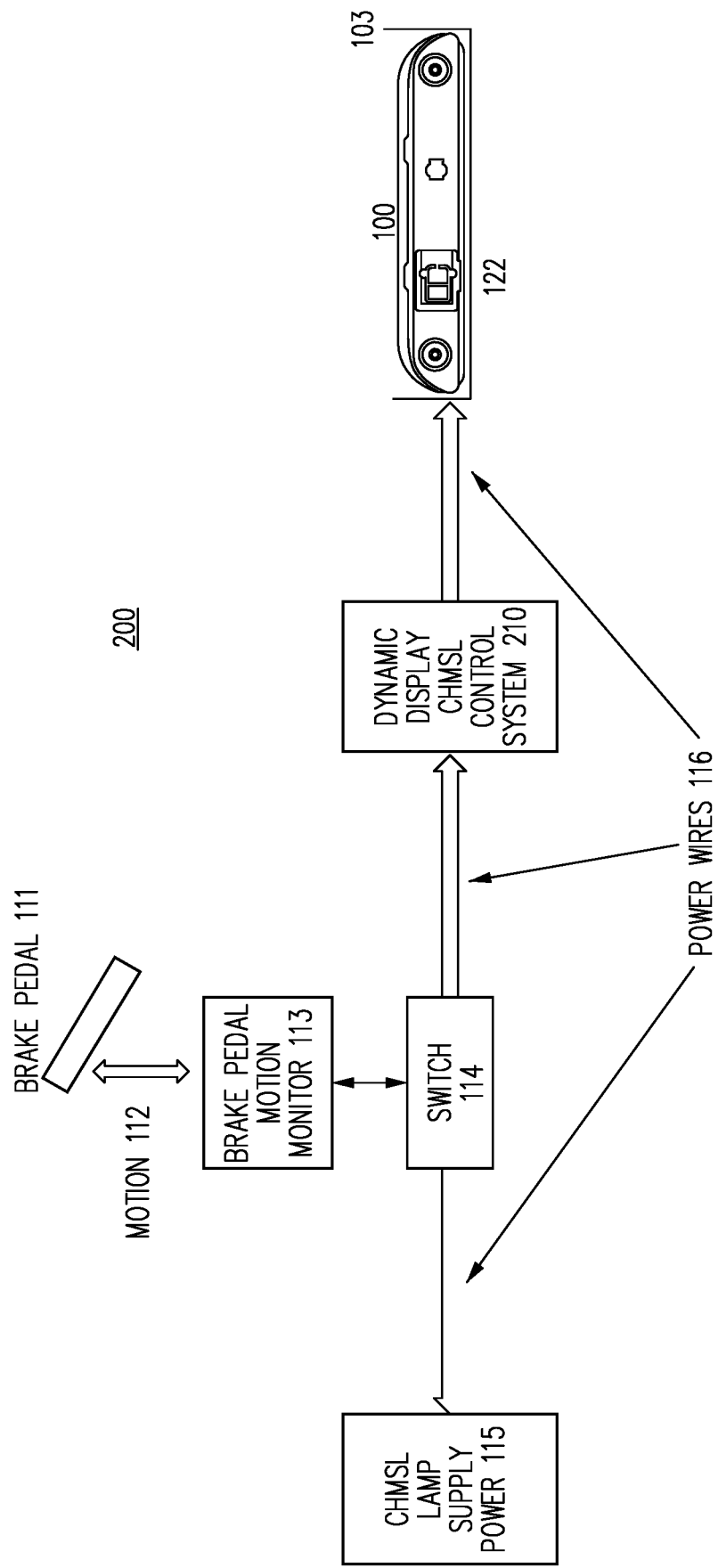
FIG. 2A is a simplified block diagram of some of the major components of a potential dynamic display CHMSL system, including a dynamic display CHMSL control system.
Figure 2B:
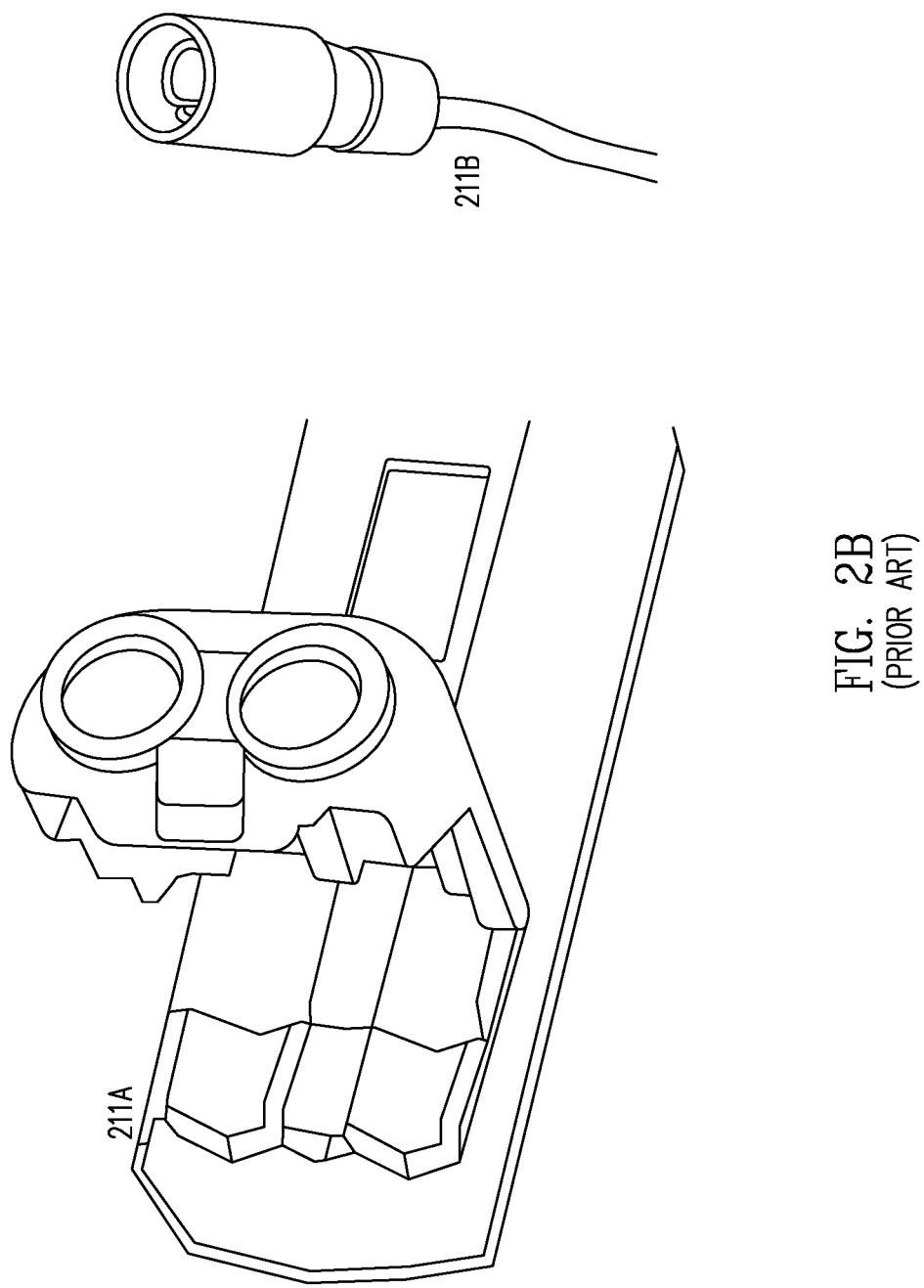
FIG. 2B shows two examples of prior art crimping and/or universal connection-based systems that could be used to splice in a dynamic display CHMSL control system.
Figure 3A:
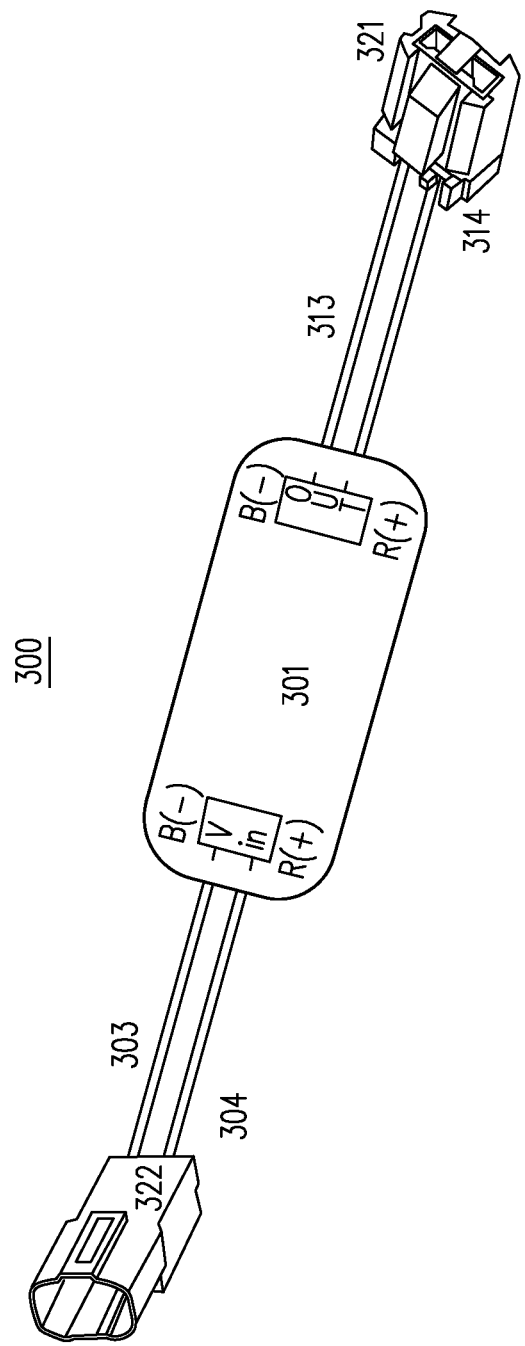
FIG. 3A shows the disclosed control system for a vehicle display in accordance with one embodiment.

FIG. 3A shows a control system 300 for a vehicle display in accordance with one embodiment. As seen in FIG. 3A, in one embodiment a control system for a vehicle display 300 includes a control system module 301 with control system circuitry and components (not shown) being enclosed in the control system module 301. In one embodiment, the control system module 301 includes one or more control system module input wires 303 extending from input connection points (not shown) inside the control system module 301 to a control system module input connector 322 at the opposite end 304 of the one or more control system module input wires 303.

As also seen in FIG. 3A, in one embodiment, the control system module 301 includes one or more control system module output wires 313 extending from output connection points inside the control system module 301 (not shown) to a control system module output connector 321 at the opposite end 314 of the one or more control system module output wires 313.

In one embodiment, the control system module input connector 322 is an OEM connector second portion, in this specific example a male OEM connector portion, used to couple to an input system and the control system module output connector 321 is an OEM connector first portion, in this specific example a female OEM connector portion, used to couple to a dynamically controlled vehicle display.

Figure 3B:
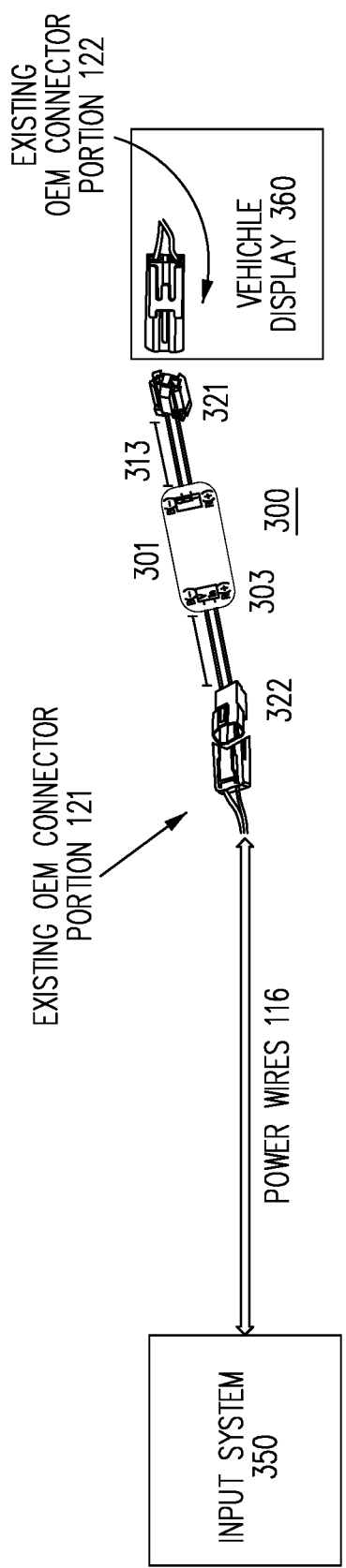
FIG. 3B shows one embodiment of the control system for a vehicle display of FIG. 3A implemented within a larger system including an input system/device and a vehicle display in accordance with one embodiment.

FIG. 3B shows the control system 300 for a vehicle display of FIG. 3A implemented within a larger system including an input system/device 350 and a vehicle display 360 in accordance with one embodiment.

As seen in FIG. 3B, in this specific example, the disclosed control system 300 for a vehicle display can be inserted between an input system 350 and a vehicle display 360 by simply disconnecting the existing OEM connector portions 121 and 122 coupling the input system 350 and the vehicle display 360, e.g., disconnecting the existing female and male OEM connection portions 121 and 122, and then attaching the pre-attached/hardwired OEM input connector second portion 322 of the control system module 301 to the existing OEM connector first portion 121 coupled to the input system 350 and attaching the pre-attached/hardwired OEM output connector first portion 321 of the control system module 301 to the existing OEM connector second portion 122 coupled to the vehicle display 360.

In this way the disclosed control system 300 for a vehicle display can be inserted between the input system 350 and the vehicle display 360 without having to identify specific wire harnesses or wires and without having to cut any wires or perform any aftermarket splicing in of the control system 300.

Figure 4A:
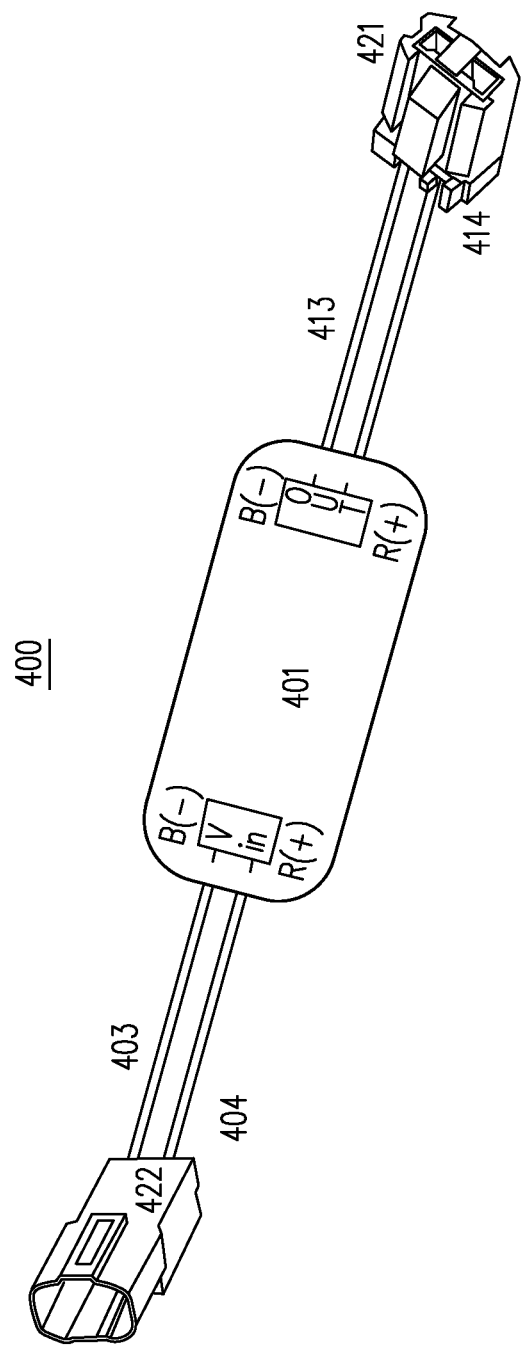
FIG. 4A shows the disclosed dynamic display CHMSL control system for a dynamic display CHMSL in accordance with one embodiment.

FIG. 4A shows the disclosed dynamic display CHMSL control system for a dynamic display CHMSL in accordance with one embodiment. Referring to FIG. 4A, in one embodiment, a dynamic display CHMSL control system 400 for a dynamic display CHMSL includes a dynamic display CHMSL control system module 401.

In one embodiment, the dynamic display CHMSL control system 400 for a dynamic display CHMSL includes a dynamic display CHMSL control system module 401 with dynamic display CHMSL control system circuitry and components (not shown) being enclosed in the dynamic display CHMSL control system module 401. In one embodiment, the dynamic display CHMSL control system module 401 includes one or more dynamic display CHMSL control system module input wires 403 extending from input connection points (not shown) inside the dynamic display CHMSL control system module 401 to a dynamic display CHMSL control system module input connector portion 422, in this specific example a male connector portion, at the opposite end 404 of the one or more dynamic display CHMSL control system module input wires 403.

In one embodiment, the dynamic display CHMSL control system module 401 includes one or more dynamic display CHMSL control system module output wires 413 extending from output connection points (not shown) inside the dynamic display CHMSL control system module 401 to a dynamic display CHMSL control system module output connector portion 421, in this specific example a female connector portion, at the opposite end 414 of the one or more dynamic display CHMSL control system module output wires 413.

In one embodiment, dynamic display CHMSL control system module input connector portion 422 is an OEM connector second portion, in this specific example a male connector portion, used to couple to an existing brake pedal/brake pedal motion monitoring system OEM connector first portion and the dynamic display CHMSL control system module output connector portion 421 is an OEM first connector portion, in this specific example an OEM female connector portion, used to connect to an existing CHMSL OEM male connector portion.

Figure 4B:
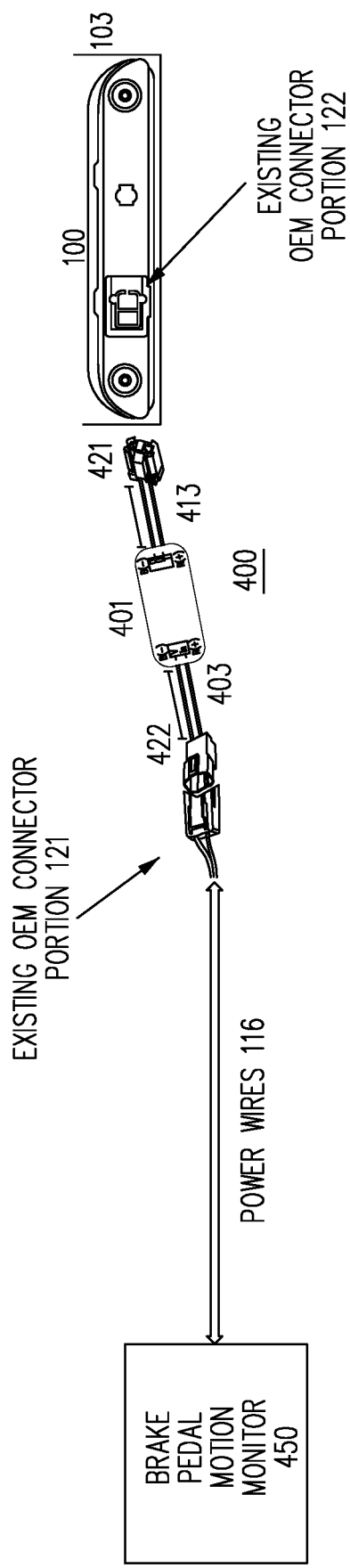
FIG. 4B shows one embodiment of the dynamic display control system for a dynamic display CHMSL of FIG. 4A implemented within a larger system including a brake pedal/brake pedal motion monitoring system and a dynamic display CHMSL in accordance with one embodiment.

FIG. 4B shows the dynamic display control system 400 for a dynamic display CHMSL of FIG. 4A implemented within a larger system including a brake pedal/brake pedal motion monitoring system 450 and a dynamic display CHMSL 100 in accordance with one embodiment.

Figure 4C:
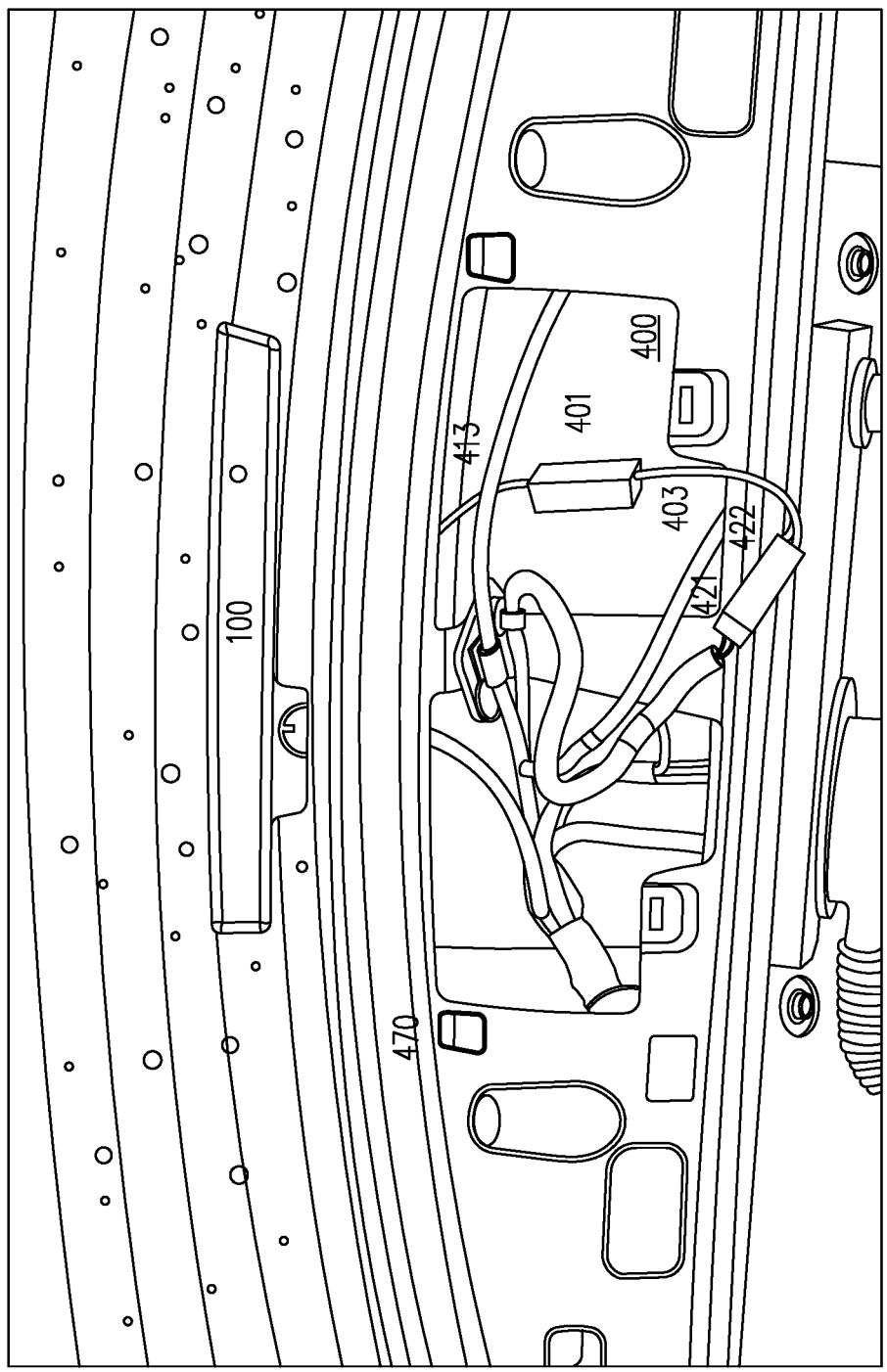
FIG. 4C shows a photograph the dynamic display control system for a dynamic display CHMSL of FIG. 4A installed in a vehicle.

FIG. 4C shows a photograph the dynamic display control system 400 for a dynamic display CHMSL of FIG. 4A installed in a vehicle 470.

Referring to FIGS. 4A, 4B, and 4C, as discussed above, in this particular illustrative example, the dynamic display CHMSL control system 400 for a dynamic display CHMSL includes a dynamic display CHMSL control system module 401 that includes an OEM connector second portion 422 pre-attached/hardwired to one or more input wires 403 of the dynamic display CHMSL control system module 401 and an OEM connector first portion 421 pre-attached to one or more output wires 413 of the dynamic display CHMSL control system module 401.

Consequently, as shown in FIG. 4B, the disclosed dynamic display CHMSL control system 400 for a dynamic display CHMSL can be inserted between a brake pedal/brake pedal motion monitoring system 450 and a CHMSL 100 by simply disconnecting the existing OEM connector portions 121 and 122 connecting the brake pedal/brake pedal motion monitoring system 450 and the CHMSL, e.g., disconnecting the existing female and male OEM connection portions 121 and 122, and then attaching the pre-attached/hardwired OEM connector second portion 422 of the dynamic display CHMSL control system module 401 to the existing OEM connector first portion 121 that is coupled to the brake pedal/brake pedal motion monitoring system 450 and attaching the pre-attached/hardwired OEM connector first portion 421 of the dynamic display CHMSL control system module 401 to the existing OEM connector second portion 122 that is coupled to the CHMSL. In this way the disclosed dynamic display CHMSL control system 400 for a dynamic display CHMSL can be inserted between the brake pedal/brake pedal motion monitoring system 450 and the CHMSL 100 without having to identify specific wire harnesses or wires and without having to cut any wires or perform any aftermarket splicing in of the disclosed dynamic display CHMSL control system 400.

In one embodiment, a control system for a vehicle display including input and output adaptors includes: a control system module with circuitry and components for a control system for a vehicle display being enclosed in the control system module; a control system module input adaptor for removably connecting one or more input wires of the control system module to an OEM input connector; and a control system module output adaptor for removably connecting one or more output wires of the control system module to an OEM output connector.

Figure 5A:
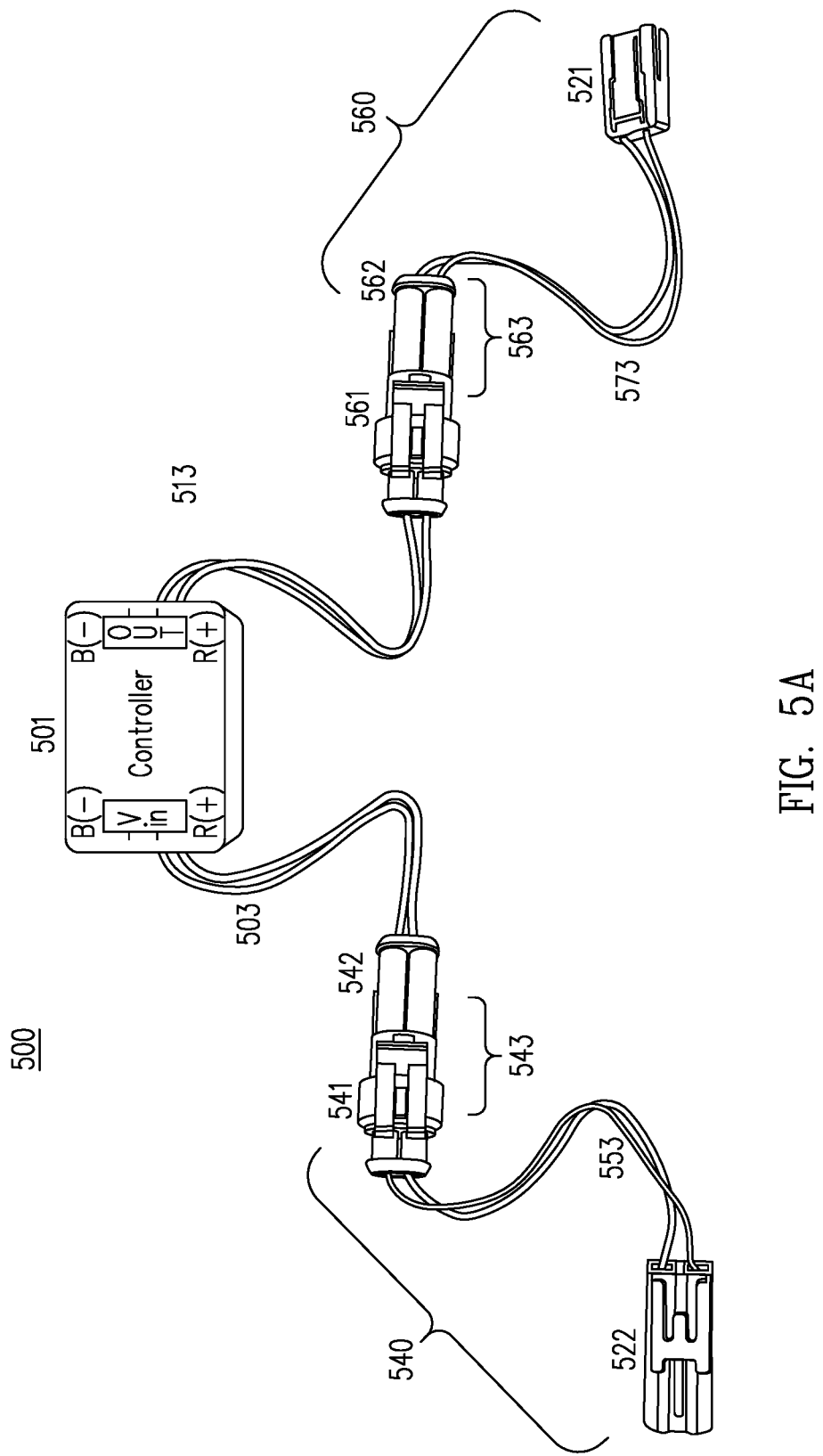
FIG. 5A shows the disclosed control system for a vehicle display including input and output adaptors in accordance with one embodiment.

FIG. 5A shows the disclosed control system for a vehicle display including input and output adaptors in accordance with one embodiment. As seen in FIG. 5A, in one embodiment a control system for a vehicle display 500 includes a control system module 501 with control system circuitry and components (not shown) being enclosed in the control system module 501.

In one embodiment, the control system module 501 includes one or more control system module input wires 503 extending from input connection points (not shown) inside the control system module 501 to a generic adaptor connector second portion 542, in this specific example a male generic adaptor connector portion, of a generic adaptor connector 543 that removably couples/connects to a generic adaptor connector first portion 541, in this specific example a female generic adaptor connector portion, of generic adaptor connector 543 and a control system module input adaptor 540 for removably connecting one or more input wires 503 of the control system module 501 to an OEM connector second portion 522 of the control system module input adaptor 540.

In one embodiment, control system module input adaptor 540 includes one or more input adaptor wires 553. In one embodiment, the control system module input adaptor 540 includes an OEM connector second portion 522, in this specific example a male OEM connector portion, connected to the one or more input adaptor wires 553. In one embodiment, the control system module input adaptor 540 includes a generic adaptor connector first portion 541 of generic adaptor connector 543 connected to the opposite end of one or more input adaptor wires 553. In one embodiment, generic adaptor connector first portion 541 of generic adaptor connector 543 can be removably connected and electrically coupled to generic adaptor connector second portion 542 of generic adaptor connector 543. In one embodiment, OEM connector second portion 522 can be removably connected and electrically coupled to an OEM connector first portion (not shown) of an input device (not shown). In this way, an OEM connector first portion (not shown) of an input device (not shown) can be removably electrically connected to the one or more control system module input wires 503 and input connection points (not shown) inside the control system module 501 using the control system module input adaptor 540.

As also seen in FIG. 5A, in one embodiment, the control system module 501 includes one or more control system module output wires 513 extending from output connection points inside the control system module 501 (not shown) to a generic adaptor connector first portion 56, in this specific example a female generic adaptor connector portion, of a generic adaptor connector 563 that removable couples/connects to a generic adaptor connector second portion 562, in this specific example a male generic adaptor connector portion, of generic adaptor connector 563 and a control system module output adaptor 560 for removably connecting the one or more input wires 513 of the control system module 501 to an OEM connector first portion 521 of control system module output adaptor 560.

In one embodiment, control system module output adaptor 560 includes one or more output adaptor wires 573. In one embodiment, the control system module output adaptor 560 includes an OEM connector first portion 521, in this specific example a female OEM connector portion, connected to the one or more output adaptor wires 573. In one embodiment, the control system module output adaptor 560 includes a generic adaptor connector second portion 562, in this specific example a male generic adaptor connector portion, of generic adaptor connector 563 connected to the opposite end of one or more output adaptor wires 573. In one embodiment, generic adaptor connector first portion 561 of generic adaptor connector 563 can be removably connected and electrically coupled to generic adaptor connector second portion 562 of generic adaptor connector 563. In one embodiment, OEM connector first portion 521 can be removably connected and electrically coupled to an existing OEM connector second portion (not shown) of a vehicle display (not shown). In this way, an OEM connector second portion (not shown) of a vehicle display (not shown) can be electrically connected to the one or more control system module output wires 513 and output connection points (not shown) inside the control system module 501 using the control system module output adaptor 560.

Figure 5B:
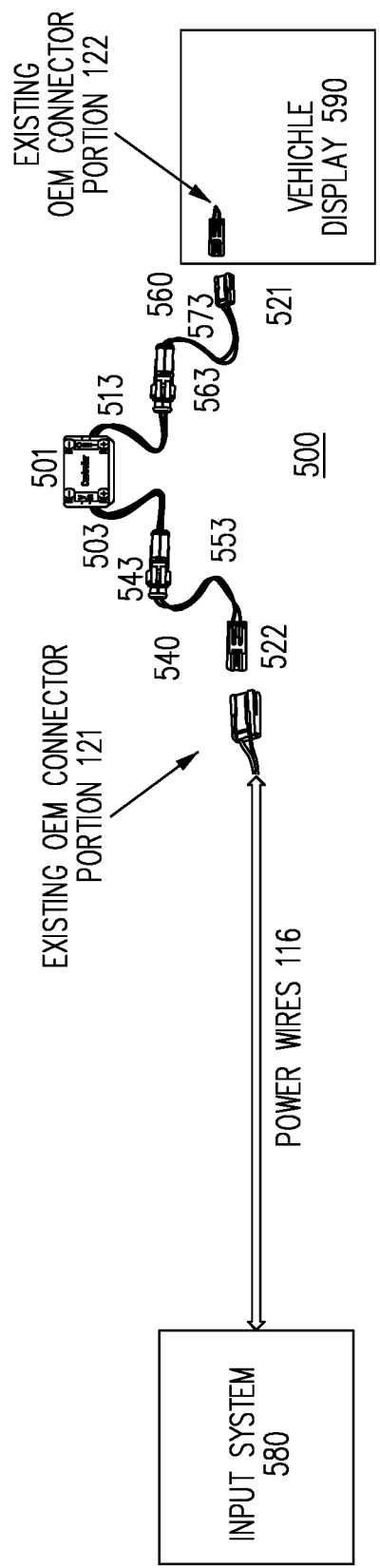
FIG. 5B shows the disclosed control system for a vehicle display including input and output adaptors of FIG. 5A implemented within a larger system including an input system/device and a vehicle display in accordance with one embodiment.

FIG. 5B shows the disclosed control system 500 for a vehicle display including input and output adaptors of FIG. 5A implemented within a larger system including an input system/device 580 and a vehicle display 590 in accordance with one embodiment.

Referring to FIGS. 5A and 5B, in one embodiment the OEM connector second portion 522 of the control system module input adaptor 540 can be connected to an existing OEM connector first portion 121 coupled to an input system. In one embodiment, the OEM connector first portion 521 of the control system module input adaptor 560 can be connected to an OEM connector second portion 122 coupled to vehicle display system 590.

Consequently, the disclosed display control system 500 for a vehicle display with input and output adaptors can be inserted between an input system 580 and a vehicle display 590 by simply disconnecting the existing OEM connector portions 121 and 122 connecting the input system 580 and the vehicle display 590, e.g., disconnecting existing female and male OEM connection portions 121 and 122, and then attaching the OEM connector second portion 522 of the control system module input adaptor 540 to the existing OEM connector first portion 121 that is coupled to the input system 580 and attaching the OEM connector first portion 521 of the output adaptor 560 to the existing OEM connector second portion 122 coupled to vehicle display system 590.

In this way the disclosed display control system 500 for a vehicle display can be inserted between the input system 580 and the vehicle display 590 without having to identify specific wire harnesses or wires and without having to cut any wires or perform any aftermarket splicing in of the display control system 500.

In addition, the use of removable control system module input and output adaptors 540 and 560 allows for the use of a single control system module 501 with numerous types of vehicles and vehicle models by simply using removable control system module input and output adaptors 540 and 560 having different OEM input and output connector portions 522 and 521.

In one embodiment, a dynamic display CHMSL control system including input and output adaptors includes: a CHMSL control system module with circuitry and components of a dynamic display CHMSL control system for a dynamic display CHMSL being enclosed in the CHMSL control system module; a CHMSL control system module input adaptor for removably connecting one or more input wires of the CHMSL control system module to an OEM connector portion of a brake pedal/brake pedal motion monitor system; and a CHMSL control system module output adaptor for removably connecting one or more output wires of the CHMSL control system module to an OEM connector portion of a CHMSL.

Figure 6A:
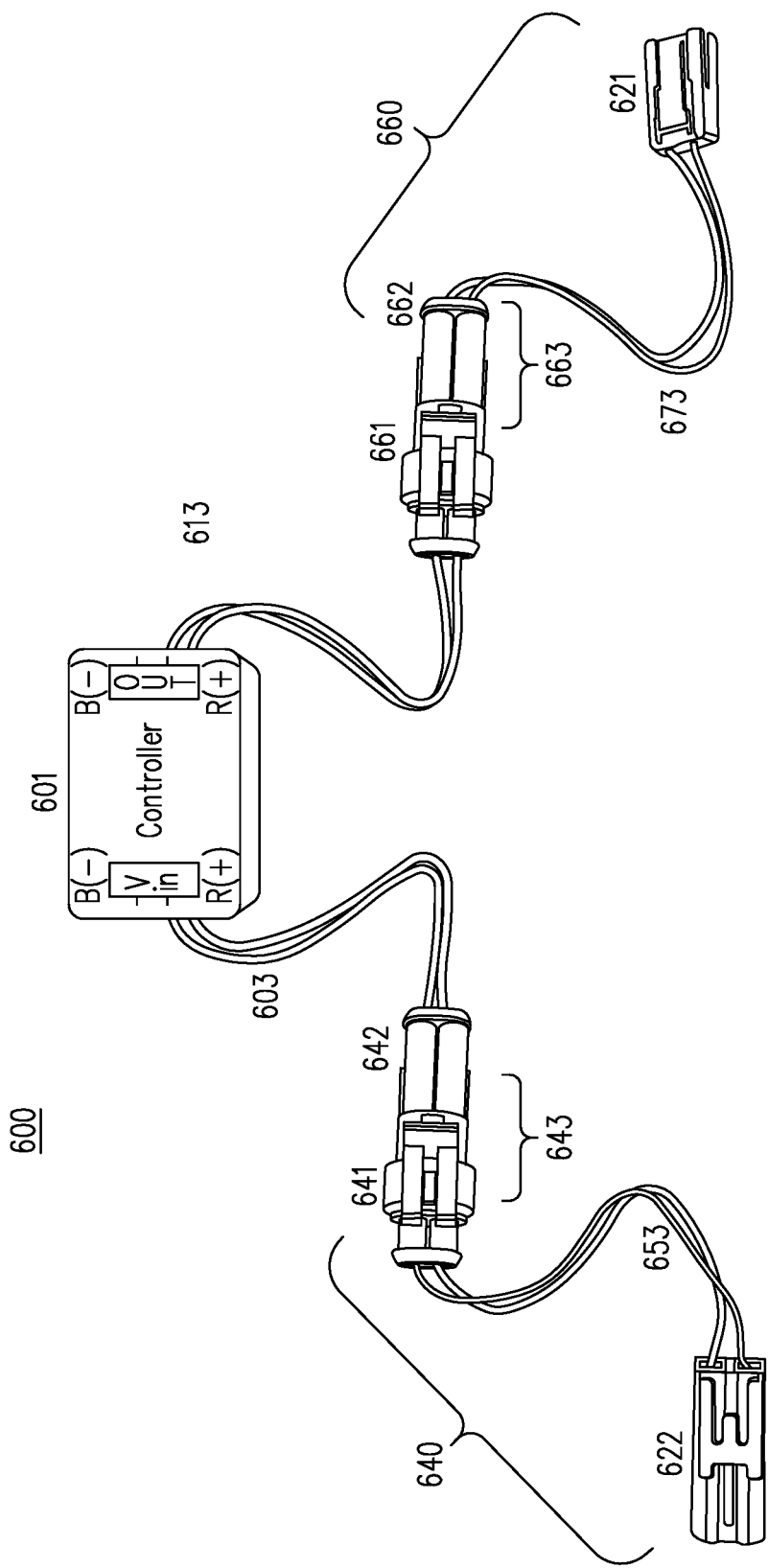
FIG. 6A shows the disclosed dynamic display CHMSL control system for a dynamic display CHMSL including input and output adaptors in accordance with one embodiment.

FIG. 6A shows the disclosed dynamic display CHMSL control system including input and output adaptors in accordance with one embodiment. As seen in FIG. 6A, in one embodiment, a dynamic display CHMSL control system 600 including input and output adaptors includes a CHMSL control system module 601 with CHMSL control system circuitry and components (not shown) being enclosed in the CHMSL control system module 601.

In one embodiment, the CHMSL control system module 601 includes one or more CHMSL control system module input wires 603 extending from input connection points (not shown) inside the CHMSL control system module 601 to a generic adaptor connector second portion 642 of a generic adaptor connector 643 that removable couples/connects to a generic adaptor connector first portion 641 of generic adaptor connector 643 and a CHMSL control system module input adaptor 640 for removably connecting one or more input wires 603 of the CHMSL control system module 601 to an OEM connector second portion 622 of the CHMSL control system module input adaptor 640.

In one embodiment, CHMSL control system module input adaptor 640 includes one or more input adaptor wires 653. In one embodiment, the CHMSL control system module input adaptor 640 includes an OEM connector second portion 622 connected to the one or more input adaptor wires 653. In one embodiment, the CHMSL control system module input adaptor 640 includes a generic adaptor connector first portion 641, in this specific example a female generic adaptor connector portion, of generic adaptor connector 643 connected to the opposite end of one or more input adaptor wires 653. In one embodiment, generic adaptor connector first portion 641 of generic adaptor connector 643 can be removably connected and electrically coupled to generic adaptor connector second portion 642 of generic adaptor connector 643. In one embodiment, OEM connector second portion 622 can be removably connected and electrically coupled to an existing OEM connector first portion (not shown) coupled to an input device (not shown). In this way, an existing OEM connector first portion (not shown) coupled to brake pedal/brake pedal motion monitor (not shown) can be removably electrically connected to the one or more CHMSL control system module input wires 603 and input connection points (not shown) inside the CHMSL control system module 601 using the CHMSL control system module input adaptor 640.

As also seen in FIG. 6A, in one embodiment, the CHMSL control system module 601 includes one or more CHMSL control system module output wires 613 extending from output connection points inside the CHMSL control system module 601 (not shown) to a generic adaptor connector first portion 661, in this specific example a female generic adaptor connector portion, of a generic adaptor connector 663 that removable couples/connects to a generic adaptor connector second portion 662, in this specific example a male generic adaptor connector portion, of generic adaptor connector 663 and a CHMSL control system module output adaptor 660 for removably connecting the one or more input wires 613 of the CHMSL control system module 601 to an OEM connector first portion 621 of CHMSL control system module output adaptor 660.

In one embodiment, CHMSL control system module output adaptor 660 includes one or more output adaptor wires 673. In one embodiment, the CHMSL control system module output adaptor 660 includes an OEM connector first portion 621, in this specific example a female OEM connector portion, connected to the one or more output adaptor wires 673. In one embodiment, the CHMSL control system module output adaptor 660 includes a generic adaptor connector second portion 662 of generic adaptor connector 663 connected to the opposite end of one or more output adaptor wires 673. In one embodiment, generic adaptor connector first portion 661 of generic adaptor connector 663 can be removably connected and electrically coupled to generic adaptor connector second portion 662 of generic adaptor connector 663. In one embodiment, OEM connector first portion 621 can be removably connected and electrically coupled to an existing OEM connector second portion (not shown) coupled to a CHMSL (not shown). In this way, an existing OEM connector second portion (not shown) coupled to a CHMSL (not shown) can be electrically connected to the one or more CHMSL control system output wires 613 and output connection points (not shown) inside the CHMSL control system module 601 using the CHMSL control system output adaptor 560.

Figure 6B:
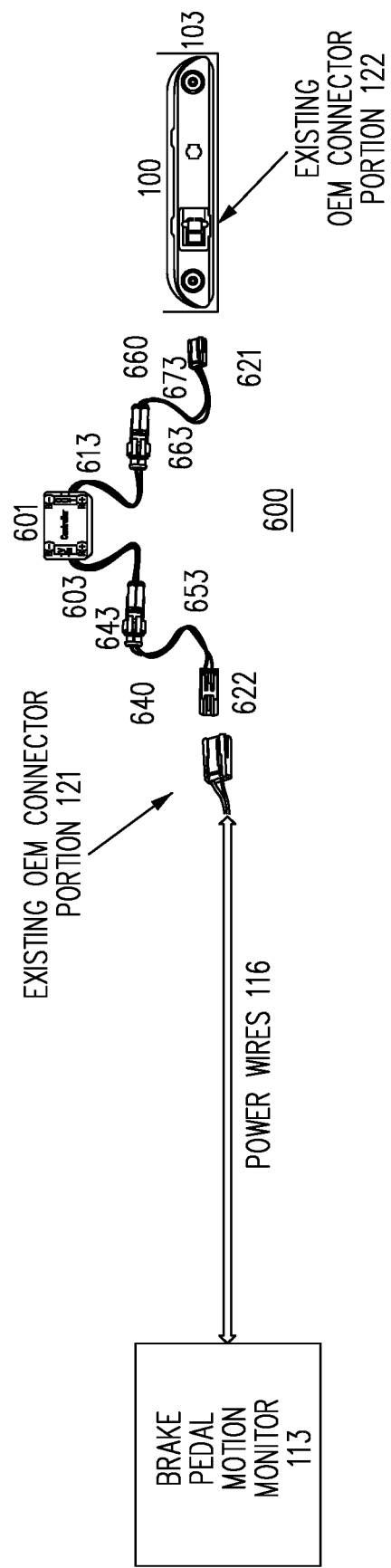
FIG. 6B shows the disclosed dynamic display CHMSL control system for a dynamic display CHMSL including input and output adaptors of FIG. 6A implemented within a larger system including a brake pedal/brake pedal motion monitoring system and a dynamic display CHMSL in accordance with one embodiment.

FIG. 6B shows the disclosed dynamic display CHMSL control system 600 including input and output adaptors of FIG. 6A implemented within a larger system including a brake pedal motion monitor 113 and a CHMSL 100 in accordance with one embodiment.

Figure 6C:
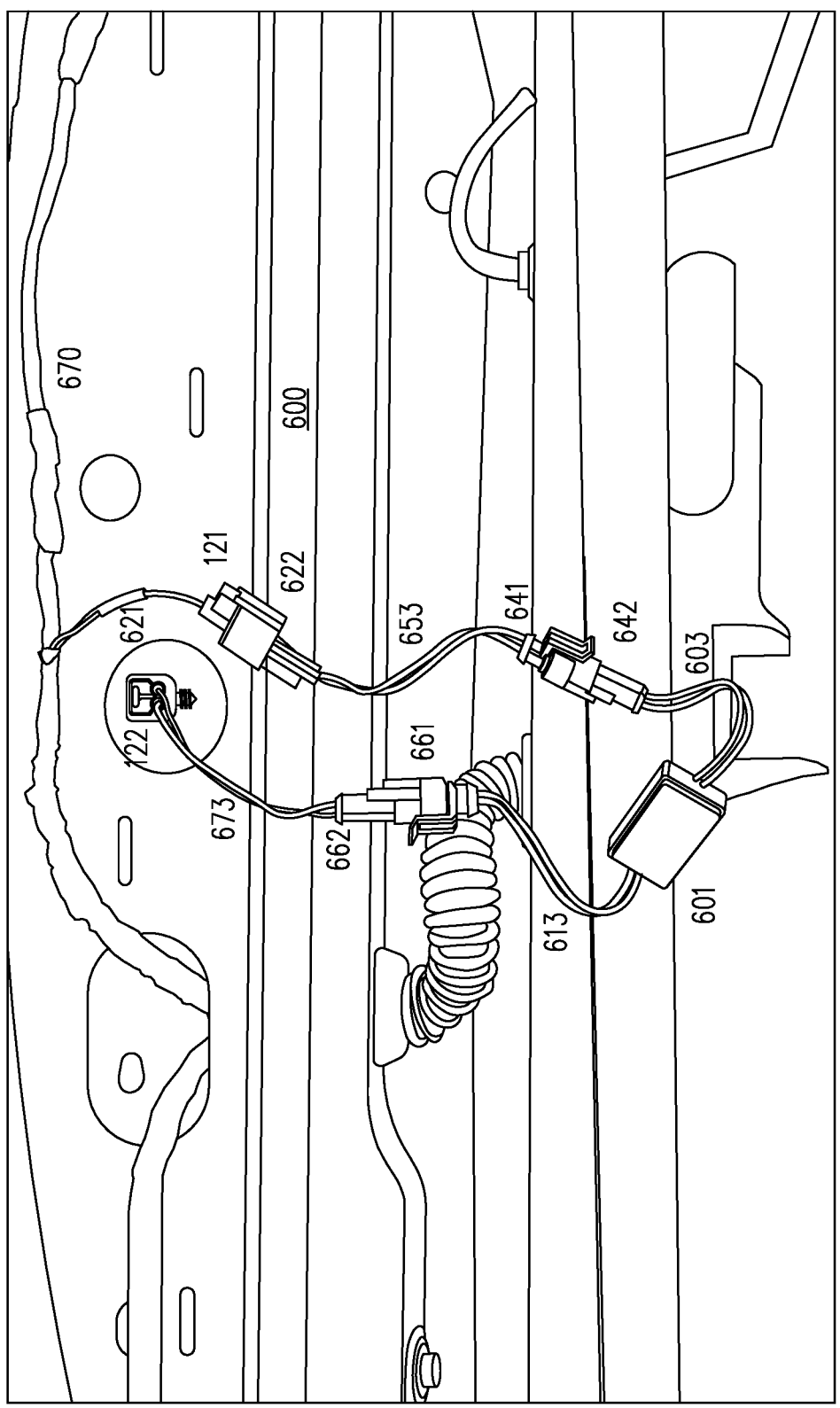
FIG. 6C shows a photograph the dynamic display CHMSL control system including input and output adaptors of FIG. 6A installed in a vehicle.

FIG. 6C shows a photograph the dynamic display CHMSL control system 600 including input and output adaptors of FIG. 6A installed in a vehicle 670.

Referring to FIGS. 6A 6B, and 6C, in one embodiment the OEM connector second portion 622 of the CHMSL control system module input adaptor 640 can be connected to an existing OEM connector first portion 121 of power wires 166 and/or a brake pedal motion monitor 113. In one embodiment, the OEM connector first portion 621 of the CHMSL control system module input adaptor 660 can be connected to an OEM connector second portion 122 coupled to CHMSL 100.

Consequently, the disclosed dynamic display CHMSL control system 600 including input and output adaptors can be inserted between brake pedal motion monitor 113 and a CHMSL 100 by simply disconnecting the existing OEM connector portions 121 and 122 connecting the brake pedal motion monitor 113 and the CHMSL 100, e.g., disconnecting existing female and male OEM connection portions 121 and 122, and then attaching the OEM connector second portion 622 of the CHMSL control system module input adaptor 640 to the existing OEM connector first portion 122 that is coupled to the brake pedal motion monitor 113 and attaching the OEM connector first portion 122 of the CHMSL control system module output adaptor 660 to the existing OEM connector second portion 121 coupled to CHMSL 100.

In this way the disclosed dynamic display CHMSL control system 600 can be inserted between the brake pedal motion monitor 113 and the CHMSL 100 without having to identify specific wire harnesses or wires and without having to cut any wires or perform any aftermarket splicing in of the dynamic display CHMSL control system 600.

In addition, the use of removable dynamic display CHMSL control system module input and output adaptors 640 and 660 allows for the use of a single CHMSL control system module 601 with numerous types of vehicles and vehicle models by simply using removable control system module input and output adaptors 640 and 660 having different OEM input and output connector portions 622 and 621.

In one embodiment, the generic adaptor connectors, such as generic adaptor connectors 543 and 563 of FIGS. 5A and 5B and 653, and 673 of FIGS. 6A and 6B discussed above are water/weather proof generic adaptor connectors. In one embodiment, the generic adaptor connectors include generic connector first and second portion pairs such as generic connector first and second portion pairs 541/542 and 561/562 of FIGS. 5A and 5B and 641/642, and 661/662 of FIGS. 6A and 6B. In this way the electrical connections made can be weather proof and moisture resistant.

Figure 7:
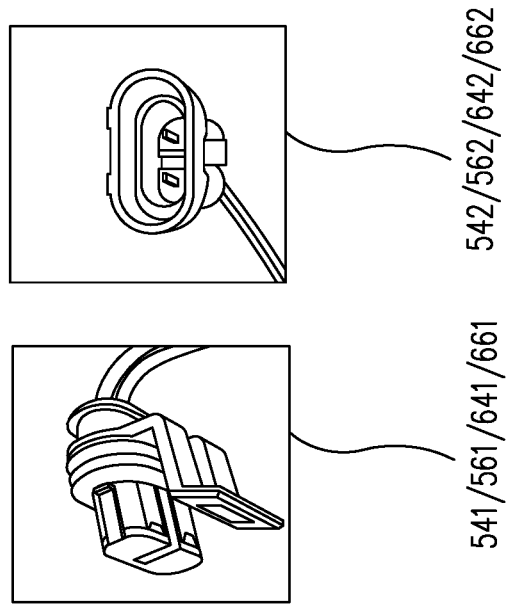
FIG. 7 shows one example of generic connector first and second portion pairs.

FIG. 7 shows one example of generic connector first and second portion pairs, such as first generic connector portions 541, 561, 641, and 661 that, in this illustrative example are female generic connector portions, and second generic connector portions 542, 562, 642, and 662 that, in this illustrative example are male generic connector portions.

In one embodiment, a method for providing a dynamic vehicle display includes providing a display control system module. In one embodiment, the method includes providing a display control system module wherein an OEM connector second portion, e.g., a female or male OEM connector portion, is pre-attached/hardwired to one or more input wires of the display control system module and an OEM connector first portion e.g., a male or female OEM connector portion that is complimentary to the OEM connector second portion, is pre-attached/hardwired to one or more output wires of the display control system module.

In one embodiment, a method for providing a dynamic vehicle display includes inserting the display control system for a vehicle display between an input system and a vehicle display by simply disconnecting the existing OEM connector first and second portions connecting the input system and the vehicle display, e.g., disconnecting the existing female and male OEM connection portions, and then attaching the pre-attached/hardwired OEM connector second portion of the display control system module to the complimentary existing OEM connector first portion attached to the input system and attaching the pre-attached/hardwired OEM connector first portion of the display control system module to the existing complimentary OEM connector second portion attached to the vehicle display.

In this way, using the disclosed methods, the display control system for a vehicle display can be inserted between an input system, such as a brake pedal motion monitor, and a vehicle display, such as a CHMSL, without having to identify specific wire harnesses or wires and without having to cut any wires or perform any aftermarket splicing in of the display control system.

In one embodiment, a method for providing a dynamic display CHMSL includes providing a dynamic display CHMSL control system for a dynamic display CHMSL.

In one embodiment, the method includes providing a dynamic display CHMSL control system that includes a dynamic display CHMSL control system module. In one embodiment, the CHMSL control system module includes an OEM connector second portion, e.g., a female or male OEM connector portion, pre-attached/hardwired to one or more input wires of the dynamic display CHMSL control system module and an OEM connector first portion e.g., a male or female OEM connector portion that is complimentary to the OEM connector second portion, pre-attached/hardwired to one or more output wires of the dynamic display CHMSL control system module.

In one embodiment, the method includes inserting the dynamic display CHMSL control system for a dynamic display CHMSL between a brake pedal/brake pedal motion monitoring system, i.e., an input system, and a CHMSL, i.e., a vehicle display, by simply disconnecting the existing OEM connector first and second portions connecting the brake pedal/brake pedal motion monitoring system and the CHMSL, e.g., disconnecting the existing female and male OEM connection portions, and then attaching the pre-attached/hardwired OEM connector second portion of the dynamic display CHMSL control system module to the complimentary existing OEM connector first portion attached to the brake pedal/brake pedal motion monitoring system and attaching the pre-attached/hardwired OEM connector first portion of the dynamic display CHMSL control system module to the existing complimentary OEM connector second portion attached to the CHMSL.

In this way, using the disclosed methods, the dynamic display CHMSL control system for a dynamic display CHMSL can be inserted between the brake pedal/brake pedal motion monitoring system and the CHMSL without having to identify specific wire harnesses or wires and without having to cut any wires or perform any aftermarket splicing in of the dynamic display CHMSL control system.

In one embodiment, a method for providing a dynamic vehicle display includes providing a display control system module.

In one embodiment, the method for providing a dynamic vehicle display includes providing a display control system module wherein the control system for a vehicle display includes a control system module with control system for a vehicle display circuitry and components being enclosed in the control system module. In one embodiment, the control system module includes one or more control system module input wires connected to electrical connections within the control system module at one end and a generic adaptor connector second portion at the other end. In one embodiment, the control system module includes one or more control system module output wires connected to electrical connections within the control system module at one end and a generic adaptor connector first portion at the other end.

In one embodiment, the method for providing a dynamic vehicle display includes providing a control system module input adaptor for removably connecting the one or more control system module input wires to an existing OEM connector second portion. In one embodiment, the control system module input adaptor includes one or more input adaptor wires connected to a generic adaptor connector first portion, which is complementary to the generic adaptor connector second portion of the control system module input wires, at one end and an OEM connector second portion at the other end.

In one embodiment, the method for providing a dynamic vehicle display includes providing a control system module output adaptor for removably connecting the one or more output wires of the control system module to an existing OEM connector second portion. In one embodiment, the control system module output adaptor includes one or more output adaptor wires connected to a generic output adaptor connector second portion, which is complementary to the generic adaptor connector first portion of the control system module output wires, at one end and an OEM connector first portion at the other end.

In one embodiment, the generic input and output adaptor connector first portions can be connected to the complimentary generic output and input adaptor connector second portions.

In one embodiment, the disclosed method includes connecting the OEM connector second portion of the control system module input adaptor to a complimentary existing OEM connector first portion of power lines and/or an input system, such as a brake pedal motion monitor. In one embodiment, the disclosed method includes connecting the OEM connector first portion of the control system module output adaptor to a complimentary existing OEM connector second portion of power wires and/or a vehicle display system, such as a CHMSL.

In one embodiment, the disclosed method includes inserting the display control system for a vehicle display between an input system and a vehicle display by simply disconnecting the existing OEM connector first and second portions connecting the input system and the vehicle display, e.g., the existing female and male OEM connection portions, and then attaching the OEM connector second portion of the control system module input adaptor to the existing OEM connector first portion coupled to the input system and attaching the OEM connector first portion of the control system module output adaptor to the existing OEM connector second portion coupled to the vehicle display.

In this way, using the disclosed methods, the display control system for a vehicle display can be inserted between the input system and the vehicle display without having to identify specific wire harnesses or wires and without having to cut any wires or perform any aftermarket splicing in of the display control system.

In addition, the use of removable control system module input and output adaptors with generic connector portions according to the disclosed methods allows for the use of a single display control system module with numerous types of vehicles, vehicle models, and vehicle displays by simply using different removable display control system module input and output adaptors having different OEM input and output connector portions.

In one embodiment, a method for providing a dynamic display CHMSL includes providing a dynamic display CHMSL control system for a CHMSL. In one embodiment, the method includes providing a dynamic display CHMSL control system module with circuitry and components for a dynamic display CHMSL control system for a CHMSL display being enclosed in the dynamic display CHMSL control system module. In one embodiment, the dynamic display CHMSL control system module includes one or more dynamic display CHMSL control system module input wires connected to electrical connections within the dynamic display CHMSL control system module at one end and a generic adaptor connector second portion at the other end. In one embodiment, the dynamic display CHMSL control system module includes one or more dynamic display CHMSL control system module output wires connected to electrical connections within the dynamic display CHMSL control system module at one end and a generic adaptor connector first portion at the other end.

In one embodiment, the method for providing a dynamic display CHMSL includes providing a dynamic display CHMSL control system module input adaptor for removably connecting the one or more input wires of the dynamic display CHMSL control system module to an existing OEM connector first portion. In one embodiment, the dynamic display CHMSL control system module input adaptor includes one or more input adaptor wires connected to a generic adaptor connector first portion at one end and an OEM connector second portion at the other end.

In one embodiment, the method for providing a dynamic display CHMSL includes providing a dynamic display CHMSL control system module output adaptor for removably connecting the one or more output wires of the dynamic display CHMSL control system module to an existing OEM connector second portion. In one embodiment, the dynamic display CHMSL control system module output adaptor includes one or more output adaptor wires connected to a generic output adaptor connector second portion at one end and an OEM connector first portion at the other end.

In one embodiment, the generic input and output adaptor connector first portions can of the disclosed method be connected to the complimentary generic output and input adaptor connector second portions.

In one embodiment, the method for providing a dynamic display CHMSL includes connecting the OEM connector second portion of the dynamic display CHMSL control system module input adaptor to a complimentary existing OEM connector first portion of power lines and/or a brake pedal motion monitor. In one embodiment, a method for providing a dynamic display CHMSL includes connecting the OEM connector first portion of the dynamic display CHMSL control system module output adaptor to a complimentary OEM connector second portion of power lines and/or a CHMSL.

In one embodiment, the method for providing a dynamic display CHMSL includes inserting the dynamic display CHMSL control system for a vehicle display between a brake pedal motion monitor and a CHMSL by simply disconnecting the existing OEM connector first and second portions connecting the input system and the CHMSL, e.g., disconnecting the existing female and male OEM connection portions, and then attaching the OEM connector second portion of the dynamic display CHMSL control system module input adaptor to the existing OEM connector first portion coupled to the brake pedal motion monitor and attaching the OEM connector first portion of dynamic display CHMSL control system control system module output adaptor to the existing OEM connector second portion coupled to the CHMSL.

In this way, using the disclosed methods, the dynamic display CHMSL control system for a vehicle display can be inserted between the brake pedal motion monitor and the CHMSL without having to identify specific wire harnesses or wires and without having to cut any wires or perform any aftermarket splicing in of the dynamic display CHMSL control system.

In addition, the use of removable dynamic display CHMSL control system module input and output adaptors with generic connector portions according to the disclosed methods allows for the use of a dynamic display CHMSL control system module with numerous types of vehicles, vehicle models, and vehicle displays by simply using different removable dynamic display CHMSL control system module input and output adaptors having different OEM input and output connector portions.

The disclosed embodiments of dynamic display CHMSL control systems for a vehicle display and dynamic display CHMSL control systems for a dynamic display CHMSL can be inserted between the input system, e.g., a brake pedal/brake pedal motion monitor system and a vehicle display, e.g., a CHMSL without having to identify specific wire harnesses or wires and without having to cut any wires or perform any aftermarket splicing in of the dynamic display CHMSL control systems/dynamic display CHMSL control systems.

In addition, the use of removable control system module input and output adaptors and/or removable CHMSL control system module input and output adaptors, in some embodiments, allows for the use of a single display control system module/dynamic display CHMSL control system module with numerous types of vehicles, vehicle models, and vehicle displays and CHMSL models by simply using different removable display control system module/dynamic display CHMSL control system module input and output adaptors having different OEM input and output connector portions.

Consequently, the disclosed methods and systems provide for the efficient, effective, and reliable installation of control systems for dynamically controlled vehicle displays such as dynamic display CHMSL control systems for dynamic display CHMSLs. Consequently, the disclosed methods and systems provide for the incorporation and wide-spread adoption of these new technologies. As one illustrative example, the disclosed methods and systems provide for the efficient, effective, and reliable installation dynamic display CHMSL control systems for dynamic display CHMSLs. Consequently, the disclosed methods and systems allow for the wide-spread adoption of dynamic display CHMSLs; thereby providing for safer roads and a potentially significant reduction in accidents.

Those of skill in the art will recognize that the various components, and/or features, discussed above are but only a few examples of the numerous components, and/or features, which can be used with, and/or included in, the disclosed cable management coaster. Consequently, the specific components, and/or features, and/or patterns, and/or colors, and/or designs discussed herein are not to be considered limiting, nor are the described methods and systems to be considered limited to these features, and/or patterns, and/or colors, and/or designs.

Consequently, one skilled in the art will readily recognize that the above discussion and FIGS. are merely illustrative examples, and that other elements, functions, and features can be provided and implemented without departing from the characteristics and features of the invention.

In addition, those of skill in the art will recognize the choice of identifying/designating various connector portions as first or second, or female or male, connector portions are interchangeable and was made to provide specific illustrative examples. Any connectors, connectors portions, types, and makes known in the art at the time of filing, or as made known/available after the time of filing could be used with the disclosed embodiments. Consequently, the designation of various connector portions as first or second, or female or male, connector portions should not be read as a limitation on the claims below.

The invention claimed is:

1. A display control system for a vehicle display comprising:
   a display control system module, the display control system module having display control system components enclosed therein;
   one or more display control system module input wires, a first end of the one or more display control system module input wires being electrically coupled to one or more display control system input connections within the display control system module;
   a display control system module OEM connector second portion hardwired to a second end of the one or more input wires of the display control system module, the display control system module OEM connector second portion being capable of connecting to corresponding OEM connector first portions; and
   one or more display control system module output wires, a first end of the one or more display control system module output wires being electrically coupled to one or more display control system output connections within the display control system module;
   a display control system module OEM connector first portion hardwired to a second end of the one or more output wires of the display control system module, the display control system module OEM connector first portion being capable of connecting to complimentary OEM connector second portions.

2. The display control system for a vehicle display of claim 1 further comprising:
   an input system;
   an input system OEM connector first portion electrically coupled to one or more output connections of the input system, the input system OEM connector first portion being electrically coupled to the display control system module OEM connector second portion such that the one or more output connections of the input system are electrically coupled to the display control system module input wires and the one or more display control system input connections within the display control system module;
   a vehicle display;
   a vehicle display OEM connector second portion electrically coupled one or more input connections of the vehicle display, the vehicle display OEM connector second portion being electrically coupled to the display control system module OEM connector first portion such that the display control system module output wires and one or more display control system output connections within the display control system module are electrically coupled to the one or more one input connections of the vehicle display.

3. The display control system for a vehicle display of claim 1 wherein the display control system module is a dynamic display Center High Mounted Signal Lamp (CHMSL) control system module for a dynamic display CHMSL having dynamic display CHMSL system components enclosed therein, the dynamic display CHMSL control system module includes:
   one or more dynamic display CHMSL control system module input wires, a first end of the one or more dynamic display CHMSL control system module input wires being electrically coupled to one or more dynamic display CHMSL control system module input connections within the dynamic display CHMSL control system module;
   a dynamic display CHMSL control system module OEM connector second portion hardwired to a second end of the one or more input wires of the dynamic display CHMSL control system module, the dynamic display CHMSL control system module OEM connector second portion being capable of connecting to corresponding OEM connector first portions;
   one or more dynamic display CHMSL control system module output wires, a first end of the one or more dynamic display CHMSL control system module output wires being electrically coupled to one or more dynamic display CHMSL control system module output connections within the dynamic display CHMSL control system module; and
   a dynamic display CHMSL control system module OEM connector first portion hardwired to a second end of the one or more output wires of the dynamic display CHMSL control system module, the dynamic display CHMSL control system module OEM connector first portion being capable of connecting to complimentary OEM connector second portions.

4. The display control system for a vehicle display of claim 3 further comprising:
- an input system;
- an input system OEM connector first portion electrically coupled to one or more output connections of the input system, the input system OEM connector first portion being electrically coupled to the dynamic display CHMSL control system module OEM connector second portion such that the one or more output connections of the input system are electrically coupled to the dynamic display CHMSL control system module input wires and the one or more dynamic display CHMSL control system input connections within the dynamic display CHMSL control system module;
- a CHMSL;
- a CHMSL OEM connector second portion electrically coupled one or more input connections of the CHMSL, the CHMSL OEM connector second portion being electrically coupled to the dynamic display CHMSL control system module OEM connector first portion such that such that the dynamic display CHMSL control system module output wires and one or more dynamic display CHMSL control system output connections within the dynamic display CHMSL control system module are electrically coupled to one or more input connections of the CHMSL.

5. The display control system for a vehicle display of claim 4 wherein the input system is a brake pedal motion monitor system.

6. A display control system for a vehicle display comprising:
- a display control system module, the display control system module having display control system components enclosed therein;
- one or more display control system module input wires, a first end of the one or more display control system module input wires being electrically coupled to one or more display control system input connections within the display control system module;
- a display control system module generic adaptor connector second portion hardwired to a second end of the one or more input wires of the display control system module, the display control system module generic adaptor connector second portion being capable of connecting to corresponding generic adaptor connector first portions;
- one or more display control system module output wires, a first end of the one or more display control system module output wires being electrically coupled to one or more display control system output connections within the display control system module;
- a display control system module generic adaptor connector first portion hardwired to a second end of the one or more output wires of the display control system module, the display control system module generic adaptor connector first portion being capable of connecting to complimentary generic adaptor connector second portions.

7. The display control system for a vehicle display of claim 6 further comprising:
- an input adaptor, the input adaptor including one or more input adaptor wires, a first end of the one or more input adaptor wires being hardwired to a generic adaptor connector first portion, the generic adaptor connector first portion being capable of connecting to the complimentary generic adaptor connector second portion of the display control system module hardwired to the second end of the one or more input wires of the display control system module, a second end of the one or more input adaptor wires being hardwired to a input adaptor OEM connector second portion, the input adaptor OEM connector second portion being capable of connecting to corresponding OEM connector first portions; and
- an output adaptor, the output adaptor including one or more output adaptor wires, a first end of the one or more output adaptor wires being hardwired to a generic adaptor connector second portion, the generic adaptor connector second portion being capable of connecting to the complimentary generic adaptor connector first portion of the display control system module hardwired to the second end of the one or more output wires of the display control system module, a second end of the one or more output adaptor wires being hardwired to a output adaptor OEM connector first portion, the output adaptor OEM connector first portion being capable of connecting to corresponding OEM connector second portions.

8. The display control system for a vehicle display of claim 7 further comprising:
- an input system;
- an input system OEM connector first portion electrically coupled to one or more output connections of the input system such that when the input system OEM connector first portion is coupled to the input adaptor OEM connector second portion and the generic adaptor connector first portion of the generic input adaptor is connected to the complimentary generic adaptor connector second portion of the display control system module, the one or more output connections of the input system are electrically coupled to the one or more display control system module input wires and the one or more display control system input connections within the display control system module;
- a vehicle display; and
- a vehicle display OEM connector second portion electrically coupled one or more input connections of the vehicle display such that when the vehicle display OEM connector second portion is coupled to the input adaptor OEM connector first portion and the generic adaptor connector second portion of the generic output adaptor is connected to the complimentary generic adaptor connector first portion of the display control system module, the one or more input connections of the vehicle display are electrically coupled to the one or more display control system module output wires and the one or more display control system output connections within the display control system module.

9. The display control system for a vehicle display of claim 6 wherein the display control system module is a dynamic display Center High Mounted Signal Lamp (CHMSL) control system module for a dynamic display CHMSL having dynamic display CHMSL system components enclosed therein, the dynamic display CHMSL control system module including:
- one or more dynamic display CHMSL control system module input wires, a first end of the one or more dynamic display CHMSL control system module input wires being electrically coupled to one or more dynamic display CHMSL control system module input connections within the dynamic display CHMSL control system module;
- a dynamic display CHMSL control system module generic adaptor connector second portion hardwired to a second end of the one or more input wires of the dynamic display CHMSL control system module, the dynamic display CHMSL control system module generic adaptor connector second portion being capable of connecting to corresponding generic adaptor connector first portions;

one or more dynamic display CHMSL control system module output wires, a first end of the one or more dynamic display CHMSL control system module output wires being electrically coupled to one or more dynamic display CHMSL control system module output connections within the dynamic display CHMSL control system module; and a dynamic display CHMSL control system module generic adaptor connector first portion hardwired to a second end of the one or more output wires of the dynamic display CHMSL control system module, the dynamic display CHMSL control system module generic adaptor connector first portion being capable of connecting to complimentary generic adaptor connector second portions.

10. The display control system for a vehicle display of claim 9 further comprising:

an input adaptor, the input adaptor including one or more input adaptor wires, a first end of the one or more input adaptor wires being hardwired to a generic adaptor connector first portion, the generic adaptor connector first portion being capable of connecting to the complimentary generic adaptor connector second portion of the dynamic display CHMSL control system module hardwired to the second end of the one or more input wires of the dynamic display CHMSL control system module, a second end of the one or more input adaptor wires being hardwired to a input adaptor OEM connector second portion, the input adaptor OEM connector second portion being capable of connecting to corresponding OEM connector first portions; and an output adaptor, the output adaptor including one or more output adaptor wires, a first end of the one or more output adaptor wires being hardwired to a generic adaptor connector second portion, the generic adaptor connector second portion being capable of connecting to the complimentary generic adaptor connector first portion of the dynamic display CHMSL control system module hardwired to the second end of the one or more output wires of the dynamic display CHMSL control system module, a second end of the one or more output adaptor wires being hardwired to a output adaptor OEM connector first portion, the output adaptor OEM connector first portion being capable of connecting to corresponding OEM connector second portions.

11. The display control system for a vehicle display of claim 10 further comprising:

an input system;

an input system OEM connector first portion electrically coupled to one or more output connections of the input system such that when the input system OEM connector first portion is coupled to the input adaptor OEM connector second portion and the generic adaptor connector first portion of the generic input adaptor is connected to the complimentary generic adaptor connector second portion of the dynamic display CHMSL control system module, the one or more output connections of the input system are electrically coupled to the one or more dynamic display CHMSL control system module input wires and the one or more dynamic display CHMSL control system input connections within the dynamic display CHMSL control system module;

a CHMSL; and a CHMSL OEM connector second portion electrically coupled one or more input connections of the CHMSL such that when the CHMSL OEM connector second portion is coupled to the input adaptor OEM connector first portion and the generic adaptor connector second portion of the generic output adaptor is connected to the complimentary generic adaptor connector first portion of the dynamic display CHMSL control system module, the one or more input connections of the CHMSL are electrically coupled to the one or more dynamic display CHMSL control system module output wires and the one or more dynamic display CHMSL control system output connections within the dynamic display CHMSL control system module.

12. The display control system for a vehicle display of claim 11 wherein the input system is a brake pedal motion monitor system.

13. A method for installing a display control system for a vehicle display comprising:

providing a display control system module, the display control system module having display control system components enclosed therein;

providing one or more display control system module input wires;

electrically coupling a first end of the one or more display control system module input wires to one or more display control system input connections within the display control system module;

hardwiring a display control system module OEM connector second portion to a second end of the one or more input wires of the display control system module, the display control system module OEM connector second portion being capable of connecting to corresponding OEM connector first portions;

providing one or more display control system module output wires;

electrically coupling a first end of the one or more display control system module output wires to one or more display control system output connections within the display control system module;

hardwiring a display control system module OEM connector first portion to a second end of the one or more output wires of the display control system module, the display control system module OEM connector first portion being capable of connecting to complimentary OEM connector second portions;

providing an input system, an input system OEM connector first portion being electrically coupled to one or more output connections of the input system;

electrically coupling the input system OEM connector first portion to the display control system module OEM connector second portion such that the one or more output connections of the input system are electrically coupled to the display control system module input wires and the one or more display control system input connections within the display control system module;

providing a vehicle display, a vehicle display OEM connector second portion being electrically coupled one or more input connections of the vehicle display; and electrically coupling the vehicle display OEM connector second portion to the display control system module OEM connector first portion such that the display control system module output wires and one or more display control system output connections within the display control system module are electrically coupled to the one or more input connections of the vehicle display.

14. The method for installing a display control system for a vehicle display of claim 13 wherein the display control system module is a dynamic display Center High Mounted Signal Lamp (CHMSL) control system module for a dynamic display CHMSL having dynamic display CHMSL system components enclosed therein.

15. The method for installing a display control system for a vehicle display of claim 14 wherein the vehicle display is a CHMSL.

16. The method for installing a display control system for a CHMSL of claim 14 wherein the input system is a brake pedal motion monitor system.

17. A method for installing a display control system for a vehicle display comprising:
- providing a display control system module, the display control system module having display control system components enclosed therein;
- providing one or more display control system module input wires;
- electrically coupling a first end of the one or more display control system module input wires to one or more display control system input connections within the display control system module;
- hardwiring a display control system module generic adaptor connector second portion to a second end of the one or more input wires of the display control system module, the display control system module generic adaptor connector second portion being capable of connecting to corresponding generic adaptor connector first portions;
- providing one or more display control system module output wires;
- electrically coupling a first end of the one or more display control system module output wires to one or more display control system output connections within the display control system module;
- hardwiring a display control system module generic adaptor connector first portion to a second end of the one or more output wires of the display control system module, the display control system module generic adaptor connector first portion being capable of connecting to complimentary generic adaptor connector second portions;
- providing an input adaptor, the input adaptor including one or more input adaptor wires, a first end of the one or more input adaptor wires being hardwired to a generic adaptor connector first portion, the generic adaptor connector first portion being capable of connecting to the complimentary generic adaptor connector second portion of the display control system module hardwired to the second end of the one or more input wires of the display control system module, a second end of the one or more input adaptor wires being hardwired to a input adaptor OEM connector second portion, the input adaptor OEM connector second portion being capable of connecting to corresponding OEM connector first portions;
- providing an output adaptor, the output adaptor including one or more output adaptor wires, a first end of the one or more output adaptor wires being hardwired to a generic adaptor connector second portion, the generic adaptor connector second portion being capable of connecting to the complimentary generic adaptor connector first portion of the display control system module hardwired to the second end of the one or more output wires of the display control system module, a second end of the one or more output adaptor wires being hardwired to a output adaptor OEM connector first portion, the output adaptor OEM connector first portion being capable of connecting to corresponding OEM connector second portions;
- providing an input system, an input system OEM connector first portion being electrically coupled to one or more output connections of the input system;
- connecting the generic adaptor connector first portion of the generic input adaptor to the complimentary generic adaptor connector second portion of the display control system module and coupling the input system OEM connector first portion to the input adaptor OEM connector second portion such that the one or more output connections of the input system are electrically coupled to the one or more display control system module input wires and the one or more display control system input connections within the display control system module;
- providing a vehicle display, a vehicle display OEM connector second portion being electrically coupled one or more input connections of the vehicle display; and
- connecting the generic adaptor connector second portion of the generic output adaptor to the complimentary generic adaptor connector first portion of the display control system module and coupling the vehicle display OEM connector second portion to the input adaptor OEM connector first portion such that the one or more input connections of the vehicle display are electrically coupled to the one or more display control system module output wires and the one or more display control system output connections within the display control system module.

18. The method for installing a display control system for a vehicle display of claim 17 wherein the display control system module is a dynamic display Center High Mounted Signal Lamp (CHMSL) control system module for a dynamic display CHMSL having dynamic display CHMSL system components enclosed therein.

19. The method for installing a display control system for a vehicle display of claim 18 wherein the vehicle display is a CHMSL.

20. The method for installing a display control system for a CHMSL of claim 19 wherein the input system is a brake pedal motion monitor system.

* * * * *

UNITED STATES PATENT AND TRADEMARK OFFICE
CERTIFICATE OF CORRECTION

PATENT NO. : 11,590,886 B1
APPLICATION NO. : 17/645389
DATED : February 28, 2023
INVENTOR(S) : Scott J. Frank It is certified that error appears in the above-identified patent and that said Letters Patent is hereby corrected as shown below:

In the Claims

In Column 24, Line 22, Claim 2, between "coupled" and "one or more input", insert --to--.
In Column 25, Line 17, Claim 4, between "coupled" and "one or more input", insert --to--.
In Column 26, Line 39, Claim 8, between "coupled" and "one or more input", insert --to--.
In Column 28, Line 6, Claim 11, between "coupled" and "one or more input", insert --to--.
In Column 28, Line 62, Claim 13, between "coupled" and "one or", insert --to--.
In Column 30, Line 32, Claim 17, between "coupled" and "one or", insert --to--.

Signed and Sealed this
Ninth Day of May, 2023

Katherine Kelly Vidal
*Director of the United States Patent and Trademark Office*